(12) United States Patent
Shirakata et al.

(10) Patent No.: US 8,064,370 B2
(45) Date of Patent: Nov. 22, 2011

(54) TRANSMITTING DEVICE, WIRELESS COMMUNICATION SYSTEM AND TRANSMITTING METHOD

(75) Inventors: Naganori Shirakata, Osaka (JP); Shuya Hosokawa, Osaka (JP); Koji Imamura, Osaka (JP); Koichiro Tanaka, Hyogo (JP); Kenji Miyanaga, Osaka (JP); Yoshio Urabe, Nara (JP); Tsutomu Mukai, Osaka (JP)

(73) Assignee: Panasonic Corporation, Osaka (JP)

( * ) Notice: Subject to any disclaimer, the term of this patent is extended or adjusted under 35 U.S.C. 154(b) by 399 days.

(21) Appl. No.: 12/281,388

(22) PCT Filed: Mar. 1, 2007

(86) PCT No.: PCT/JP2007/053924
§ 371 (c)(1),
(2), (4) Date: Sep. 2, 2008

(87) PCT Pub. No.: WO2007/100048
PCT Pub. Date: Sep. 7, 2007

(65) Prior Publication Data
US 2009/0034647 A1    Feb. 5, 2009

(30) Foreign Application Priority Data
Mar. 2, 2006 (JP) .................................. 2006-055831
Jun. 21, 2006 (JP) .................................. 2006-171105

(51) Int. Cl.
*H04B 7/005* (2006.01)
(52) U.S. Cl. ....................................... 370/278; 370/328
(58) Field of Classification Search .................. 370/278, 370/328, 320, 321, 342, 347
See application file for complete search history.

(56) References Cited

U.S. PATENT DOCUMENTS

| 6,473,624 | B1 | 10/2002 | Corbett et al. |
| 6,653,977 | B1 | 11/2003 | Okabe et al. |
| 6,819,259 | B2 | 11/2004 | Yamaguchi |
| 7,006,451 | B2 | 2/2006 | Kuwahara |
| 7,016,396 | B2 | 3/2006 | Agrawal et al. |
| 7,016,697 | B2 | 3/2006 | Ngal et al. |
| 7,039,038 | B2 * | 5/2006 | Shoemake ................. 370/349 |

(Continued)

FOREIGN PATENT DOCUMENTS
EP    1128579    *  8/2001
(Continued)

OTHER PUBLICATIONS

International Search Report issued May 29, 2007 in the International (PCT) Application of which the present application is the U.S. National Stage.

(Continued)

*Primary Examiner* — Chuong T Ho
(74) *Attorney, Agent, or Firm* — Wenderoth, Lind & Ponack, L.L.P.

(57) ABSTRACT

At a time T131, a wireless communication apparatus 11A determines to transmit a data packet, and then performs interference signal detection for a period TA. At a time T132, which precedes a time T133 at which the period TA has elapsed since the time T131, the wireless communication apparatus 11A detects a data packet d21 (an interference signal). At a time T134, at which a period TB has elapsed since the time T132 at which the interference signal has been detected, the wireless communication apparatus 11A starts transmitting a data packet d11 to a wireless communication apparatus 12A. At a time T136, the wireless communication apparatus 11A completes the transmission of the data packet d11.

3 Claims, 30 Drawing Sheets

U.S. PATENT DOCUMENTS

| | | | |
|---|---|---|---|
| 7,050,452 B2 | 5/2006 | Sugar et al. | |
| 7,136,929 B2 * | 11/2006 | Koprivica | 709/232 |
| 7,154,448 B2 | 12/2006 | Lee | |
| 7,190,967 B2 | 3/2007 | Kawai et al. | |
| 7,239,615 B2 * | 7/2007 | Nevo et al. | 370/278 |
| 7,433,965 B2 | 10/2008 | Kawal et al. | |
| 2001/0039183 A1 * | 11/2001 | Kobayashi et al. | 455/63 |
| 2002/0031100 A1 * | 3/2002 | Sashihara | 370/294 |
| 2002/0041584 A1 * | 4/2002 | Sashihara | 370/337 |
| 2002/0132590 A1 | 9/2002 | Marshall | |
| 2003/0064752 A1 | 4/2003 | Adachi et al. | |
| 2003/0236103 A1 | 12/2003 | Tamaki et al. | |
| 2004/0028006 A1 * | 2/2004 | Kayama et al. | 370/320 |
| 2004/0171402 A1 | 9/2004 | Tamaki et al. | |
| 2005/0176382 A1 | 8/2005 | Mochizuki et al. | |
| 2005/0245237 A1 | 11/2005 | Adachi et al. | |
| 2006/0072530 A1 * | 4/2006 | Strutt et al. | 370/338 |
| 2006/0128310 A1 | 6/2006 | Leabman | |
| 2009/0135972 A1 * | 5/2009 | Tanaka et al. | 375/346 |
| 2010/0037124 A1 * | 2/2010 | Hoshi et al. | 714/799 |

FOREIGN PATENT DOCUMENTS

| | | |
|---|---|---|
| JP | 11-205322 | 7/1999 |
| JP | 2001-237847 | 8/2001 |
| JP | 2001-257682 | 9/2001 |
| JP | 2001-345809 | 12/2001 |
| JP | 2002-198867 | 7/2002 |
| JP | 2002-325084 | 11/2002 |
| JP | 2003-60562 | 2/2003 |
| JP | 2003-179611 | 6/2003 |
| JP | 2004-32015 | 1/2004 |
| JP | 2004-260637 | 9/2004 |
| JP | 2005-175542 | 6/2005 |
| JP | 2005-197765 | 7/2005 |

OTHER PUBLICATIONS

International Search Report issued Aug. 29, 2006 in the International (PCT) Application PCT/JP2006/311550 (U.S. Appl. No. 11/916,884).

"Information technology—Telecommunications and information exchange between system—Local and metropolitan area networks—Specific requirements—Part 11", ANSI/IEEE Std 802.11, 1999 Edition, R2003.

U.S. Office Action dated Jan. 27, 2011 issued in U.S. Appl. No. 11/916,884.

* cited by examiner

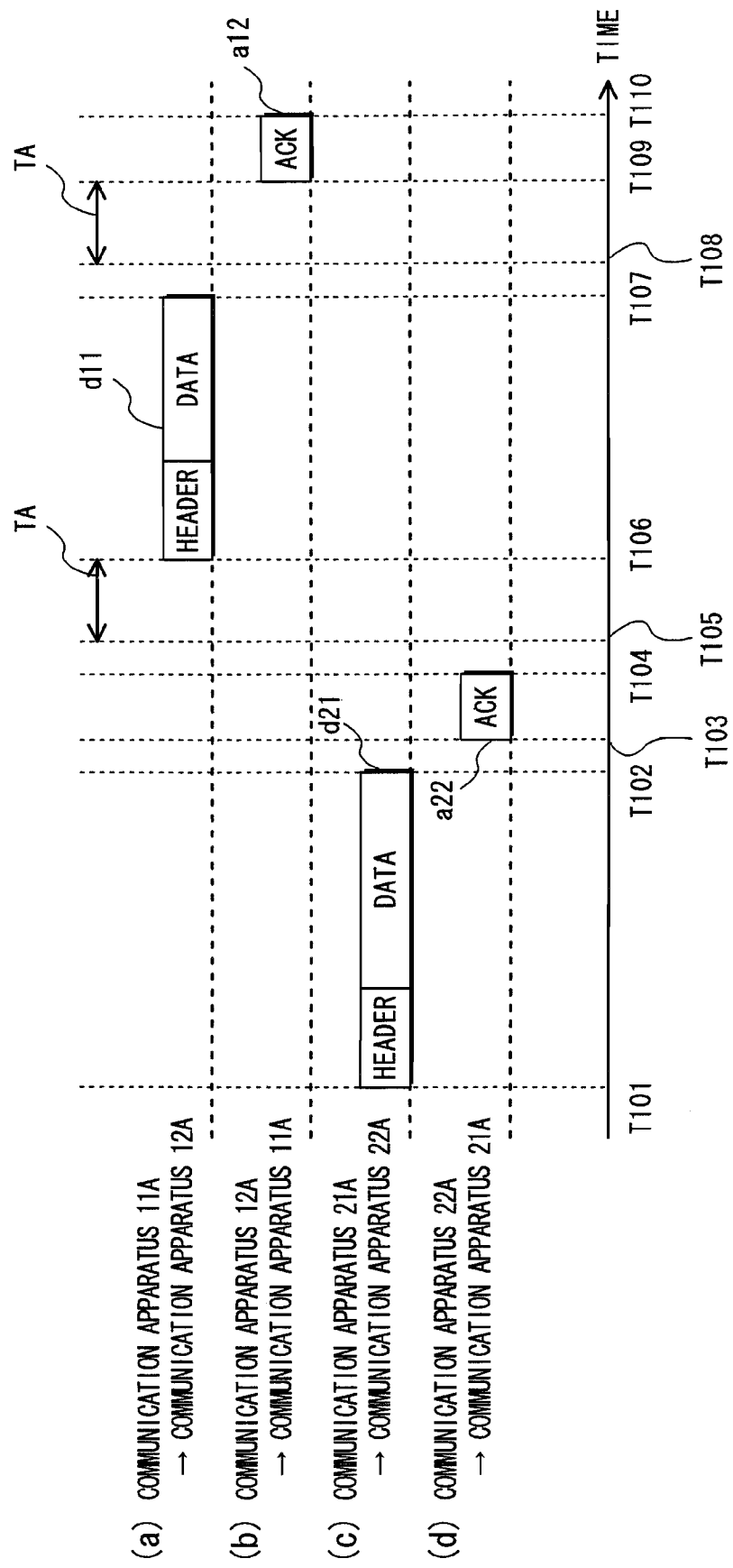

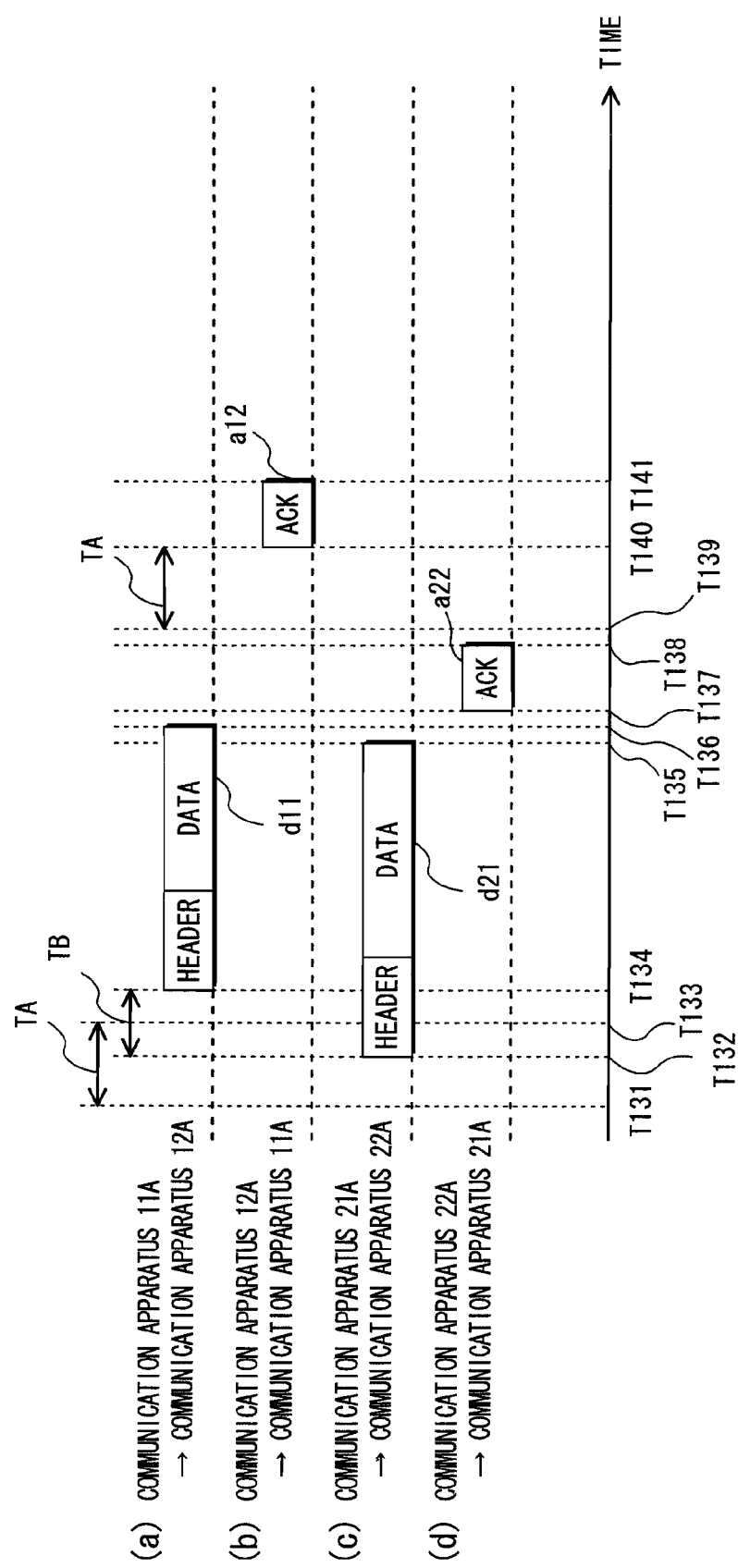

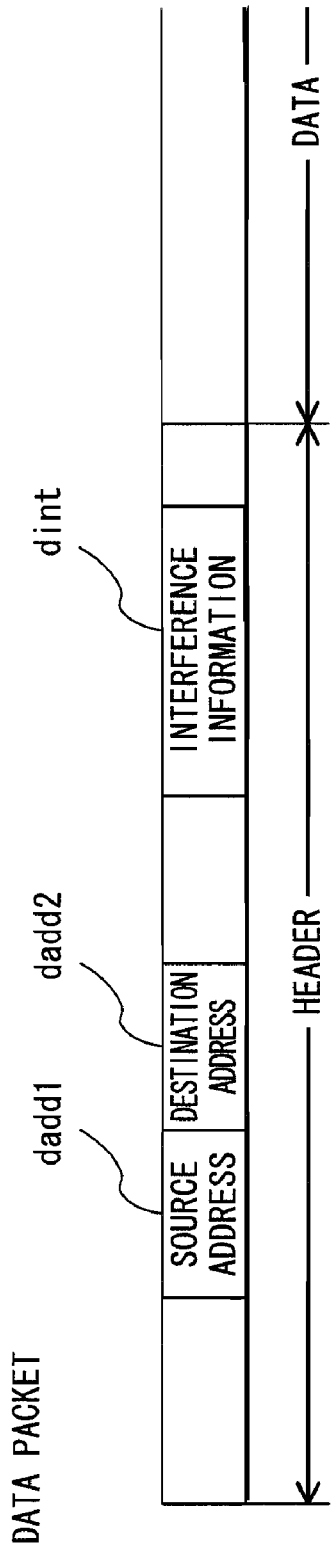
FIG. 4A DATA PACKET
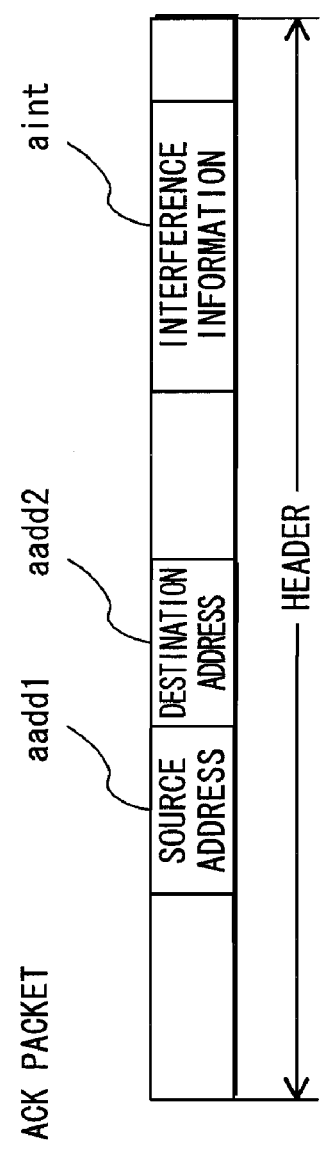
FIG. 4B ACK PACKET

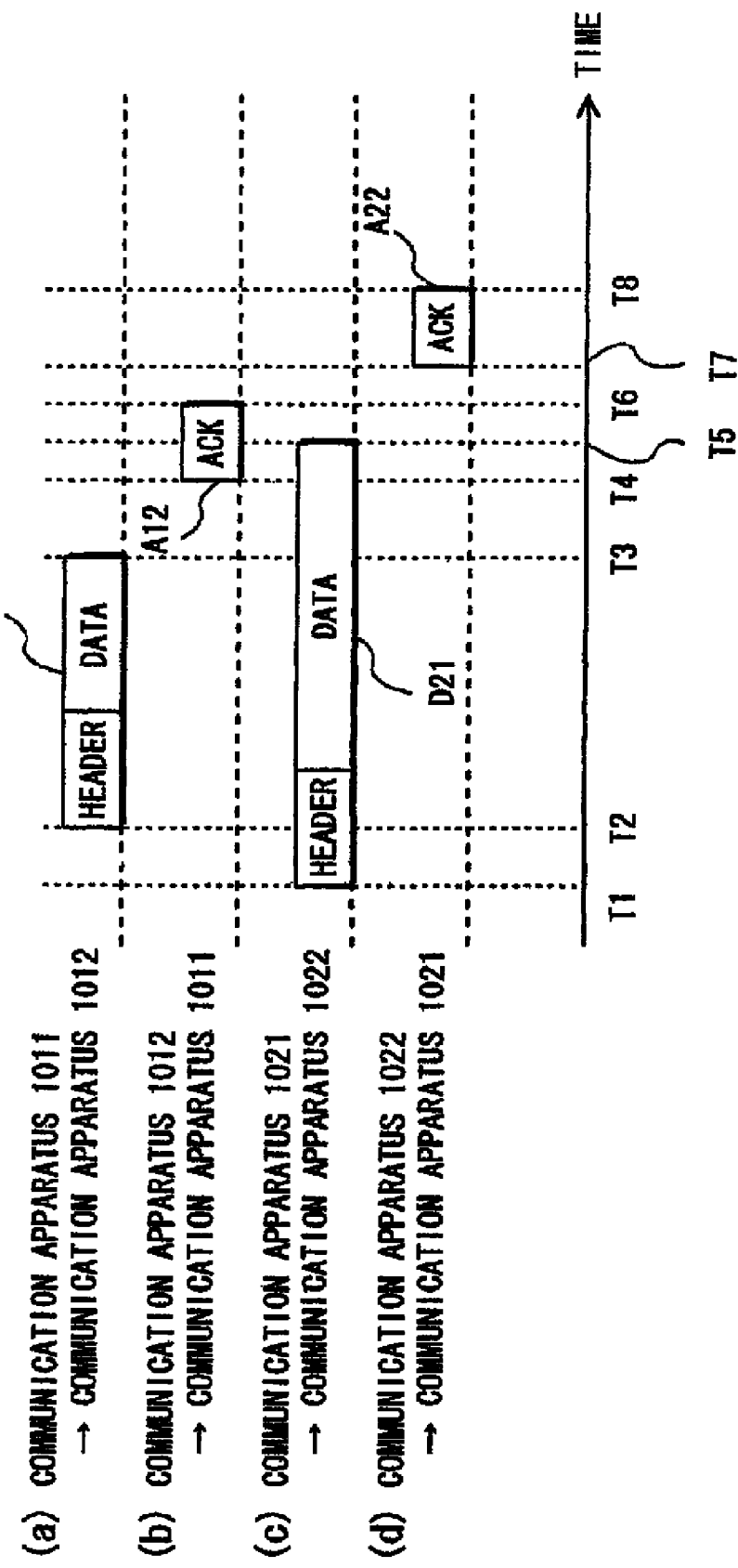

TRANSMITTING DEVICE, WIRELESS COMMUNICATION SYSTEM AND TRANSMITTING METHOD

BACKGROUND OF THE INVENTION

1. Field of Invention

The present invention relates to an art for suppressing influence of an interference signal on a desired signal transmitted from a transmitter to a receiver.

2. Description of the Related Art

Conventionally, a wireless communication system such as a wireless LAN (Local Area Network) system and a digital cellular communication system includes a plurality of wireless communication apparatuses (that function as transmitters and receivers). These wireless communication apparatuses share a predetermined frequency band to perform communications with each other. Accordingly, a signal received by each of the wireless communication apparatuses includes a signal transmitted to the wireless communication apparatus (hereinafter referred to as a "desired signal") and a signal that is irrelevant to communication of the wireless communication apparatus. The irrelevant signal is for communication between other wireless communication apparatuses. Note that a signal included in a received signal, other than a desired signal, is hereinafter referred to as an "interference signal". The interference signal includes radio waves leaked from various apparatuses other than the wireless communication apparatuses included in the wireless communication system.

Next, the outline of a wireless communication system is described.

FIG. 28 shows a conventional wireless communication system. In FIG. 28, wireless communication apparatuses 1011 and 1012 perform communications with each other. Also, wireless communication apparatuses 1021 and 1022 perform communications with each other. In FIG. 28, as well as FIGS. 29, 30A and 30B, solid lines represent desired signals, and dotted lines and dashed-dotted lines represent interference signals.

For example, the wireless communication apparatus 1011 transmits a data packet D11 generated by packetizing transmission data to the wireless communication apparatus 1012. When normally receiving the data packet D11, the wireless communication apparatus 1012 transmits an ACK (ACKnowledgement) packet A12 to the wireless communication apparatus 1011.

Also, the wireless communication apparatus 1021 transmits a data packet D21 generated by packetizing transmission data to the wireless communication apparatus 1022. When normally receiving the data packet D21, the wireless communication apparatus 1022 transmits an ACK packet A22 to the wireless communication apparatus 1021.

There is a case where the data packet D21 and the ACK packet A22 transmitted and received between the wireless communication apparatuses 1021 and 1022 can be received by the wireless communication apparatuses 1011 and 1012, as an interference signal.

FIG. 29 shows an example of a transmission sequence of the wireless communication system shown in FIG. 28. In FIG. 29 and other figures showing transmission sequences, each of the wireless communication apparatuses is simply described as a "communication apparatus".

For a period from a time T2 to a time T3, the wireless communication apparatus 1011 transmits the data packet D11 to the wireless communication apparatus 1012. For a period from a time T4 to a time T6, the wireless communication apparatus 1012 transmits the ACK packet A12 to the wireless communication apparatus 1011.

For a period from a time T1 to a time T5, the wireless communication apparatus 1021 transmits the data packet D21 to the wireless communication apparatus 1022. For a period from a time T7 to a time T8, the wireless communication apparatus 1022 transmits the ACK packet A22 to the wireless communication apparatus 1021.

For a period included in the period (from the time T2 to the time T3) for which the wireless communication apparatus 1012 receives the data packet D11, the wireless communication apparatus 1012 receives the data packet D21 as an interference signal. Accordingly, when the wireless communication apparatus 1012 is located adjacent to the wireless communication apparatus 1021 for example, a power of the data packet D21 received by the wireless communication apparatus 1012 is high. This increases the possibility that an error will occur in demodulation processing of the data packet D11. Likewise, when the wireless communication apparatus 1011 receives the ACK packet A12 concurrently with an interference signal, there is a high possibility that an error will occur in demodulation processing of the ACK packet A12.

Note that influence of an interference signal on a desired signal also depends on a channel frequency of the desired signal and a channel frequency of the interference signal.

FIG. 30A is a pattern diagram showing the CCI (Co-Channel Interference). When a channel band for a desired signal is the same as a channel band for an interference signal, the interference signal exerts a great influence on the desired signal. As a result, there is a high possibility that an error will occur in demodulation processing of the desired signal.

FIG. 30B is a pattern diagram showing the ACI (Adjacent Channel Interference). When a channel band for a desired signal is different from a channel band for an interference signal, the interference signal exerts a less influence on the desired signal, compared with a case where the channel band for the desired signal is the same as the channel band for the interference signal. However, when an electric power leaked to outside the channel band is high, for example when the interference signal is a broadband signal and nonlinear distortion occurs in a transmission power amplifier, an error might occur in demodulation processing of the desired signal due to the influence of the interference signal.

Also, when the wireless communication apparatus 1011 coexists with apparatuses included in another wireless communication system and apparatuses that leak radio waves, such as apparatuses that radiate a 5 GHz band radar, a radio wave radiated by such apparatuses might exert influence on a desired signal, as an interference signal. This also might cause occurrence of error in demodulation processing of the desired signal due to the influence of the interference signal. Note that the wireless communication system using the 2.4 GHz band includes the wireless LAN system, the Bluetooth system, and the cordless telephone system. The wireless communication system using the 5 GHz band includes the wireless LAN system and the wireless access system. Also, the apparatuses that leak radio waves include microwave ovens using the 2.4 GHz band, for example.

In view of the above, as one of conventional arts for suppressing influence of an interference signal on a desired signal, an art handles a case where the interference signal is a radar periodically arriving at a wireless communication apparatus (See Patent Document 1, for example).

According to the above conventional art, the wireless communication apparatus determines a length of a packet to be output therefrom so as to be no more than a length of a transmission interval of interference signals that periodically arrive at the wireless communication apparatus. Then, the wireless communication apparatus transmits the packet while the wireless communication apparatus is not receiving the interference signal. In this way, the wireless communication apparatus performs control such that the packet to be transmitted therefrom (a desired signal) is not superimposed on the radar (an interference signal).

[Patent Document 1] Japanese Laid-Open Patent Application Publication No. 2001-257682.

BRIEF SUMMARY OF THE INVENTION

1. Problems the Invention is Going to Solve

However, according to the above-described conventional art, a length and a transmission timing of a packet are determined based on an arrival interval of interference signals that periodically arrive at the wireless communication apparatus. Accordingly, the conventional art cannot be used in an environment where interference signals arrive at random times. Also, the wireless communication apparatus is controlled so as not to transmit a packet while the wireless communication is receiving an interference signal. As a result, the transmission efficiency is reduced.

In view of the above problem, the present invention aims to provide a transmitter, a wireless communication system, and a transmission method that are capable of suppressing occurrence of a demodulation error of a desired signal and suppressing reduction in the transmission efficiency as much as possible, even in an environment where interference signals arrive at random times. The present invention is based on the assumption that a receiver has a function of suppressing an interference signal included in a received signal by receiving in advance the interference signal.

2. Means to Solve the Problems

In order to achieve the above aim, the present invention provides a transmitter that performs wireless communication with a receiver that has a function of suppressing an interference signal included in a received signal to acquire a desired signal by receiving the interference signal in advance for a predetermined period. This transmitter comprises: a detection unit operable to detect an arriving interference signal; a transmission unit operable to transmit a packet to the receiver; and a transmission timing control unit operable to cause the transmission unit to transmit the packet after elapse of the predetermined period since the detection unit has detected the interference signal.

The present invention provides a wireless communication system including a transmitter that wirelessly transmits a packet to a receiver that has a function of suppressing an interference signal included in a received signal to acquire a desired signal by receiving the interference signal in advance for a predetermined period. This transmitter comprises: a detection unit operable to detect an arriving interference signal; a transmission unit operable to transmit a packet to the receiver; and a transmission timing control unit operable to cause the transmission unit to transmit the packet after elapse of the predetermined period since the detection unit has detected the interference signal.

The present invention provides a transmission method used in a transmitter that wirelessly transmits a packet to a receiver that has a function of suppressing an interference signal included in a received signal to acquire a desired signal by receiving the interference signal in advance for a predetermined period. This transmission method comprises: a detection step for detecting an arriving interference signal; a transmission step for transmitting a packet to the receiver; and a transmission timing control step for controlling a transmission timing such that the transmission step transmits the packet after elapse of the predetermined period since the detection unit has detected the interference signal.

3. Effect of the Invention

According to the above transmitter, wireless communication system, and transmission method, the transmitter performs interference signal detection. When the transmitter detects an interference signal, the transmitter transmits a packet to the receiver after elapse of a predetermined period since the detection unit has detected the interference signal. Accordingly, even in an environment where interference signals arrive at random times, the receiver receives an interference signal for the predetermined period before receiving a packet from the transmitter. In this way, the receiver can secure a period for acquiring information necessary for suppressing an interference signal included in a received signal before receiving a desired signal. As a result, according to the above transmitter, wireless communication system, and transmission method, even in an environment where interference signals arrive at random times, it is possible to suppress occurrence of a demodulation error of a desired signal in the receiver due to an interference signal. Also, according to the above transmitter, wireless communication system, and transmission method, the transmission unit can transmit a packet while the transmitter is receiving an interference signal. As a result, it is possible to suppress reduction in the transmission efficiency as much as possible.

The above transmitter may further comprise a transmission packet length control unit operable to control a length of the packet to be transmitted at a time, based on a result of the detection of the interference signal by the detection unit.

With this structure, even when an interference signal arrives at the transmitter while the transmitter continues to transmit a packet until the packet has been completely transmitted, the transmitter controls a length of the packet to be transmitted at a time. Accordingly, there is a case where it is possible to suppress occurrence of a demodulation error of a desired signal in the receiving unit due to the interference signal.

The above transmitter may further comprise a transmission packet length control unit operable to cause the transmission unit to divide the packet into subpackets during the transmission of the packet and temporarily suspend the transmission, based on variation in a level of the interference signal detected by the detection unit during the transmission.

With this structure, even when an interference signal arrives at the transmitter while the transmitter continue to transmit a packet until the packet has been completely transmitted, there is a case where it is possible to suppress occurrence of a demodulation error of a desired signal in the receiving unit due to the interference signal, by dividing the packet into subpackets during the transmission of the packet.

In the above transmitter, in a case where the transmission unit transmits the packet at a time, when a new interference signal is expected to arrive before the transmission of the packet has completed, the transmission packet length control unit may cause the transmission unit to divide the packet into the subpackets.

With this structure, the transmitter does not divide a packet more than necessary. Accordingly, it is possible to prevent the transmission efficiency from being reduced.

In the above transmitter, if the transmission unit divides the packet into the subpackets to transmit the packet, the transmission unit may insert, into at least one of the subpackets, predetermined information indicating that the packet has been divided.

In the above transmitter, if the transmission unit divides the packet into the subpackets to transmit the packet, the transmission unit may transmit, to the receiver, notification information indicating that the packet has been divided.

With these structures, the receiver can recognize that the transmitter has divided the packet into subpackets to transmit the packet.

The above transmitter may further comprise a transmission packet length control unit operable to, based on a length of a packet included in a header of the interference signal detected by the detection unit, control a length of the packet to be transmitted by the transmission unit.

With this structure, even when an interference signal arrives at the transmitter while the transmitter continues to transmit a packet obtained by packetizing transmission data until the packet has been completely transmitted, for example, there is a case where it is possible to suppress occurrence of a demodulation error of a desired signal in the receiving unit due to the interference signal, by controlling a length of the packet to be transmitted.

In the above transmitter, when the detection unit detects another interference wave before elapse of the predetermined period since the detection unit has detected the interference wave, the transmission timing control unit may cause the transmission unit to transmit the packet after elapse of the predetermined period since the detection unit has detected the another interference wave.

With this structure, when a new interference signal arrives at the transmitter before elapse of a predetermined period since the detection unit has detected an interference signal, the receiver can receive the new interference signal for the predetermined period before receiving a packet from the transmitter. Accordingly, it is possible to suppress influence of the new interference signal on a desired signal.

In the above transmitter, the transmission unit may transmit the packet using a plurality of streams, the transmitter may further comprise: an interference number detection unit operable to detect the number of interference signals detected by the detection unit; and a transmission stream number control unit operable to control the number of streams to be used by the transmission unit, based on the number of the interference signals detected by the interference number detection unit.

With this structure, it is possible to suppress influence of an interference signal on a desired signal and increase the number of streams to be used.

BRIEF DESCRIPTION OF THE DRAWINGS

FIG. 2 shows an example of a transmission sequence of the wireless communication system shown in FIG. 1;

FIG. 3 shows another example of the transmission sequence of the wireless communication system shown in FIG. 1;

FIGS. 4A and 4B show the structure of data packets and ACK packets transmitted and received between wireless communication apparatuses shown in FIG. 1;

FIG. 29 shows an example of a transmission sequence of the wireless communication system shown in FIG. 28.

DETAILED DESCRIPTION OF THE INVENTION

First Embodiment

The following describes a first embodiment of the present invention with reference to the drawings.

<Outline of Wireless Communication System>

Figure 1:
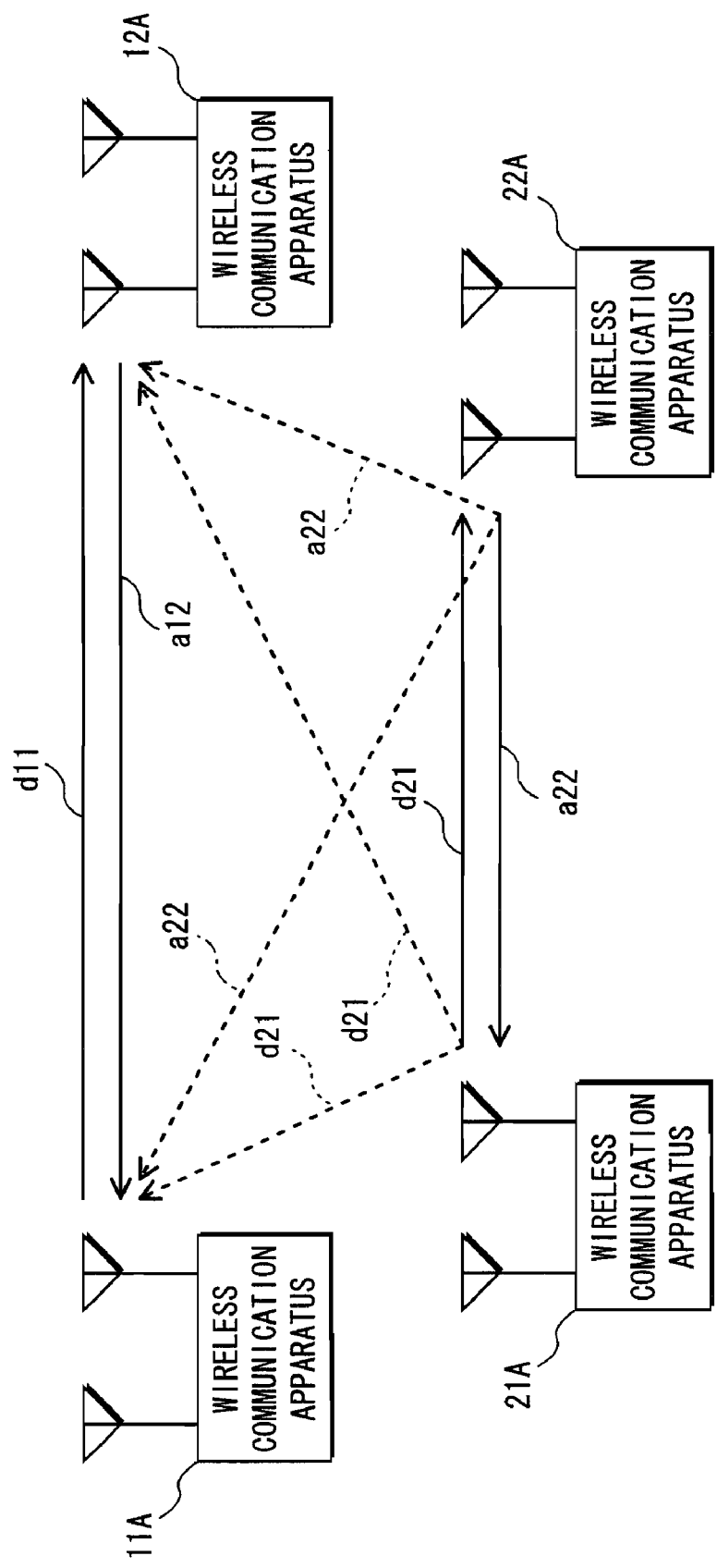
FIG. 1 shows the structure of a wireless communication system according to a first embodiment.

FIG. 1 shows the structure of a wireless communication system according to the first embodiment. Note that each of the wireless communication apparatuses 11A and 12A operates as the wireless communication apparatus of the present invention, and also operates as a receiver having a function of suppressing an interference signal included in a received signal by receiving the interference signal in advance for a predetermined period. Each of other wireless communication apparatuses included in the wireless communication system does not operate as the wireless communication apparatus of the present invention. However, each of the other wireless communication apparatuses may operate as the wireless communication apparatus of the present invention.

In FIG. 1, the wireless communication apparatuses 11A and 12A perform communications with each other. Also, wireless communication apparatuses 21A and 22A perform communications with each other. In FIG. 1, solid lines represent desired signals, and dotted lines represent interference signals.

For example, the wireless communication apparatus 11A transmits a data packet d11 to the wireless communication apparatus 12A. The wireless communication apparatus 12A transmits an ACK packet a12 to the wireless communication apparatus 11A.

The wireless communication apparatus 21A transmits a data packet d21 to the wireless communication apparatus 22A. The wireless communication apparatus 22A transmits an ACK packet a22 to the wireless communication apparatus 21A.

There is a case where the data packet d21 and the ACK packet a22 transmitted/received between the wireless communication apparatuses 21A and 22A can be received as interference signals by the wireless communication apparatuses 11A and 12A.

Here, before describing the apparatus structure and processing flow of the wireless communication apparatuses 11A and 12A, a specific example of a transmission sequence of the wireless communication system is described.

<Transmission Sequence Example (1)>

FIG. 2 shows an example of a transmission sequence of the wireless communication system shown in FIG. 1. Note that, in the transmission sequence shown in FIG. 2, while the wireless communication apparatuses 11A and 12A transmit/receive packets (data packets and ACK packets) to/from each other, the wireless communication apparatuses 21A and 22A do not transmit/receive packets to/from each other.

For a period from a time T101 to a time T102, the wireless communication apparatus 21A transmits the data packet d21 to the wireless communication apparatus 22A. For a period from a time T103 to a time T104, the wireless communication apparatus 22A transmits the ACK packet a22 to the communication apparatus 21A, as a response to the data packet d21.

At a time T105, the wireless communication apparatus 11A determines to transmit a data packet, and does not immediately transmit the data packet, and performs interference signal detection for a predetermined period TA. The period TA for performing the interference signal detection is determined in order to detect as many interference signals as possible that exert influences on data packets and ACK packets. A length of the period TA may be a fixed length, and alternatively may be shortened or lengthened depending on the interference situation. For example, in a situation where there are few interference sources, it is preferable to shorten the period TA so as to start transmitting packets earlier. Also, in a situation where there are many interference sources, it is preferable to lengthen the period TA so as to spend a long time to perform interference signal detection.

For the period TA from the time T105 to a time T106, the wireless communication apparatus 11A does not detect an interference signal. At the time T106, the wireless communication apparatus 11A starts transmitting the data packet d11 to the wireless communication apparatus 12A. At a time T107, the wireless communication apparatus 11A completes the transmission of the data packet d11.

At a time T108, the wireless communication apparatus 12A determines to transmit an ACK packet as a response to the data packet d11, and then performs interference signal detection for the period TA.

For the period TA from the time T108 to a time T109, the wireless communication apparatus 12A does not detect an interference signal. At the time T109, the wireless communication apparatus 12A starts transmitting the ACK packet a12 to the wireless communication apparatus 11A. At a time T110, the wireless communication apparatus 12A completes the transmission of the ACK packet a12.

<Transmission Sequence Example (2)>

FIG. 3 shows another example of the transmission sequence of the wireless communication system shown in FIG. 1. Note that, in the transmission sequence shown in FIG. 3, before the period TA has elapsed since the wireless communication apparatus 11A has determined to transmit a data packet, the wireless communication apparatus 21A transmits a data packet.

At a time T131, the wireless communication apparatus 11A determines to transmit a data packet, and then performs interference signal detection for the period TA.

At a time T132 included in the period TA for which the wireless communication apparatus 11A performs interference signal detection, the wireless communication apparatus 21A starts transmitting the data packet d21 to the wireless communication apparatus 22A. At a time T135, the wireless communication apparatus 21A completes the transmission of the data packet d21. For a period from a time T137 to a time T138, the wireless communication apparatus 22A transmits the ACK packet a22 to the wireless communication apparatus 21A, as a response to the data packet d21.

At the time 1132 preceding a time 1133 at which the period TA has elapsed since the time T131, the wireless communication apparatus 11A detects the data packet d21 (an interference signal). The wireless communication apparatus 11A judges whether it is possible to transmit a data packet concurrently with the interference signal (described in detail later). In this transmission sequence, the wireless communication apparatus 11A judges that it is possible to transmit the data packet concurrently with the interference signal.

At a time T134 when a predetermined period TB has elapsed since the time T132 when the wireless communication apparatus 11A has detected the interference signal, the wireless communication apparatus 11A starts transmitting the data packet d11 to the wireless communication apparatus 12A. At a time T136, the wireless communication apparatus 11A completes the transmission of the data packet d11.

Note that the period TB is determined in advance based on a period necessary for a wireless communication apparatus on the receiving side to acquire a characteristic amount of an interference signal (information necessary for suppressing influence of the interference signal on a desired signal) from the interference signal, for example. Alternatively, the period TB may be determined based on a length of a preamble or a control symbol that are inserted into a head of the interference signal.

At a time T139, the wireless communication apparatus 12A determines to transmit an ACK packet as a response to the data packet d11, and then performs interference signal detection for the period TA.

For the period TA from the time T139 to a time T140, the wireless communication apparatus 12A does not detect an interference signal. At the time T140, the wireless communication apparatus 12A starts transmitting the ACK packet a12 to the wireless communication apparatus 11A. At a time T141, the wireless communication apparatus 12A completes the transmission of the ACK packet a12.

Note that when the wireless communication apparatus 12A detects an interference signal before the period TA has elapsed since the time T139, if the wireless communication apparatus 12A judges that it is possible to transmit an ACK packet concurrently with the interference signal, the wireless communication apparatus 12A starts transmitting the ACK packet at a time when the period TB has elapsed since the interference signal has been detected.

<Data Packet and ACK Packet>

FIGS. 4A and 4B show the structure of data packets and ACK packets transmitted and received between the wireless communication apparatuses 11A and 12A.

Each of the data packets includes a header and data. The header includes a source address "dadd1", a destination address "dadd2", and interference information "dint". The interference information "dint" is, for example, information relating to an interference signal detected by the wireless communication apparatus, a power level at which a desired signal (a data packet or an ACK packet) is transmitted, and a power level at which a desired signal is received. The information relating to the interference signal is channel information indicating a channel band for the interference signal and a reception power level of the detected interference signal that have been detected by the wireless communication apparatus, and interference resistance (for example, the lowest level of a power ratio of an interference wave to a desired wave, at which the wireless communication apparatus can demodulate the desired signal).

Each of the ACK packets is composed of only a header. The header includes a source address "aadd1", a destination address "aadd2", and interference information "aint". The interference information "aint" has the same information items as the interference information "dint".

<Structure of Wireless Communication Apparatus>

Figure 5:
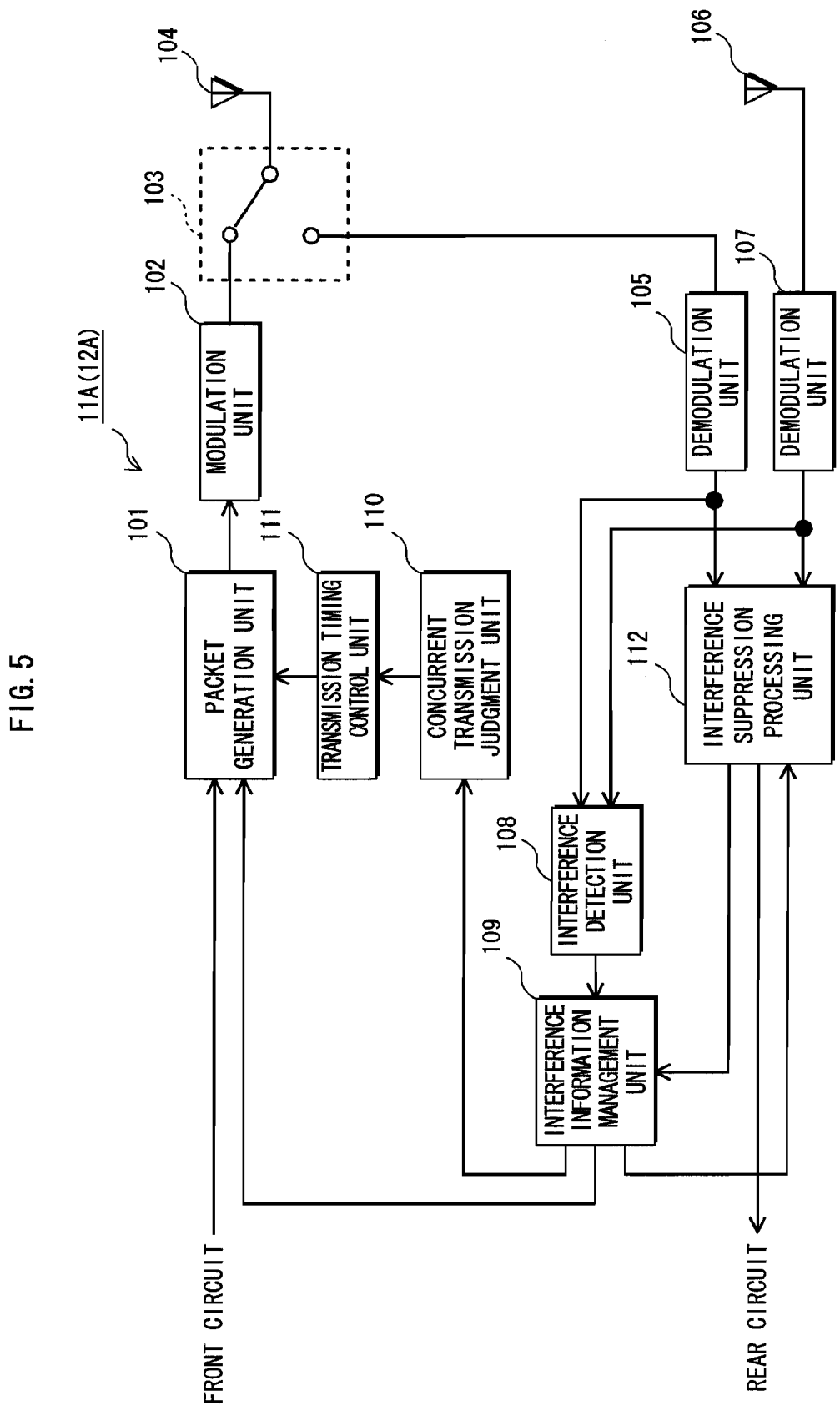
FIG. 5 shows the apparatus structure of a wireless communication apparatus according to the first embodiment.

FIG. 5 shows the apparatus structure of the wireless communication apparatus 11A shown in FIG. 1. Note that the wireless communication apparatus 12A has the same structure as the wireless communication apparatus 11A.

The wireless communication apparatus 11A includes a packet generation unit 101, a modulation unit 102, a switch circuit 103, antennas 104 and 106, demodulation units 105 and 107, an interference detection unit 108, an interference information management unit 109, a concurrent transmission judgment unit 110, a transmission timing control unit 111, and an interference suppression processing unit 112.

In accordance with a transmission instruction issued by the transmission timing control unit 111, the packet generation unit 101 generates a data packet (see FIG. 4A) by adding a header to transmission data input from a front circuit, and outputs the generated data packet to the modulation unit 102. The header of the data packet includes a source address, a destination address, and interference information input by the interference information management unit 109.

Also, in accordance with a transmission instruction issued by the transmission timing control unit 111, the packet generation unit 101 generates an ACK packet (see FIG. 4B), and outputs the generated ACK packet to the modulation unit 102. The header of the ACK packet includes a source address, a destination address, and interference information input by the interference information management unit 109.

The modulation unit 102 modulates a packet (a data packet or an ACK packet) input by the packet generation unit 101 to a radio frequency band. The packet modulated to the radio frequency band by the modulation unit 102 is output from the antenna 104 via the switch circuit 103.

When the wireless communication apparatus transmits a packet, the switch circuit 103 connects an output end of the modulation unit 102 and the antenna 104. For the rest, the switch circuit 103 connects an output end of the demodulation unit 105 and the antenna 104.

The demodulation unit 105 demodulates a signal with a radio frequency band received by the antenna 104 and input via the switch circuit 103 to a baseband frequency band, and outputs the demodulated received signal to the interference detection unit 108 and the interference suppression processing unit 112.

The demodulation unit 107 demodulates a signal with a radio frequency band received by the antenna 106 to a baseband frequency band, and outputs the demodulated received signal to the interference detection unit 108 and the interference suppression processing unit 112. The number of pairs of the antenna 106 and the demodulation unit 107 is not limited to one, and may be plural.

For example, the demodulation unit 105 demodulates a received signal with a channel band that is the same as a channel band through which the wireless communication apparatus transmits a packet (hereinafter, referred to as the "same channel"). Also, the demodulation unit 107 demodulates a received signal with a channel band adjacent to a channel band through which the wireless communication apparatus transmits a packet (hereinafter, referred to as an "adjacent channel").

The interference detection unit 108 performs interference signal detection based on an input by the demodulation units 105 and 107, and outputs a result of the detection to the interference information management unit 109.

In the first embodiment, the interference detection unit 108 performs interference signal detection of an interference signal on an adjacent channel based on an input by the demodulation unit 107, and outputs channel information indicating the adjacent channel and a power level at which the detected interference signal is received to the interference information management unit 109.

Note that it may be possible to specify a wireless communication apparatus that transmits an interference signal exerting a great influence on a desired signal in a wireless communication apparatus as a communication party, and detect only interference signals transmitted by the specified wireless communication apparatus. Alternatively, it may be possible to specify an interference signal exerting a great influence on a desired signal in a wireless communication apparatus as a communication party, and detect only the specified interference signal.

The interference information management unit 109 stores therein the channel information of the interference signal and the power level thereof detected by the interference detection unit 108. Also, the interference information management unit 109 stores therein a power level at which the packet is transmitted, and interference information included in a header of a signal transmitted to the wireless communication apparatus input by the interference suppression processing unit 112 (a desired signal), and a power level at which the desired signal is received, in correspondence with a source address included in the header (an address of a wireless communication apparatus as a communication party).

Based on the data stored therein, the interference information management unit 109 generates the above-described interference information, and outputs the generated interference information to the packet generation unit 101, and then outputs information indicating an interference signal that needs to be suppressed to the interference suppression processing unit 112. Furthermore, the interference information management unit 109 outputs, to the concurrent transmission judgment unit 110, channel information of the interference signal and a reception power level thereof detected in the wireless communication apparatus, and information stored therein in correspondence with the address of wireless communication apparatus as the communication party.

When the interference detection unit 108 detects an interference signal, the concurrent transmission judgment unit 110 judges whether it is possible to transmit a packet concurrently with the interference signal based on the information input by the interference information management unit 109. Then, the concurrent transmission judgment unit 110 outputs, to the transmission timing control unit 111, concurrent transmission information indicating whether the concurrent transmission is possible.

The concurrent transmission judgment unit 110 judges whether the concurrent transmission is possible by estimating whether interference resistance of a wireless communication apparatus as a communication party (included in interference information of a signal transmitted from the wireless communication apparatus as the communication party) is satisfied, with use of a power level at which the wireless communication apparatus as the communication party receives a desired signal (included in the interference information of the signal transmitted from the wireless communication apparatus as the communication party), and a power level at which the wireless communication apparatus transmits the desired signal, and a power level at which the wireless communication apparatus receives an interference signal detected thereby.

When the interference detection unit 108 does not detect an interference signal, at a time when the period TA has elapsed since transmission of the packet has been determined, the transmission timing control unit 111 instructs the packet generation unit 101 to transmit the packet.

When the interference detection unit 108 detects an interference signal and the concurrent transmission information input by the concurrent transmission judgment unit 110 indicates that concurrent transmission is possible, at a time when the period TB has elapsed since the interference signal has been detected, the transmission timing control unit 111 instructs the packet generation unit 101 to transmit the packet.

When the interference detection unit 108 detects the interference signal and the concurrent transmission information input by the concurrent transmission judgment unit 110 indicates that concurrent transmission is impossible, at a time when the interference signal is no longer detected, the transmission timing control unit 111 instructs the packet generation unit 101 to transmit the packet.

When information indicating an interference signal that needs to be suppressed is input by the interference information management unit 109, the interference suppression processing unit 112 performs processing for reducing a level of the interference signal by adjusting amplitudes and phases of received signals input by the demodulation units 105 and 107 to combine the received signals. Then, the interference suppression processing unit 112 decodes a signal obtained as a result of the processing (a desired signal) to obtain decoded data. The interference suppression processing unit 112 outputs the decoded data to a rear circuit, and outputs a power level at which the desired signal is received and interference information included in a header of the desired signal to the interference information management unit 109.

<Structure of Interference Suppression Processing Unit>

Figure 6:
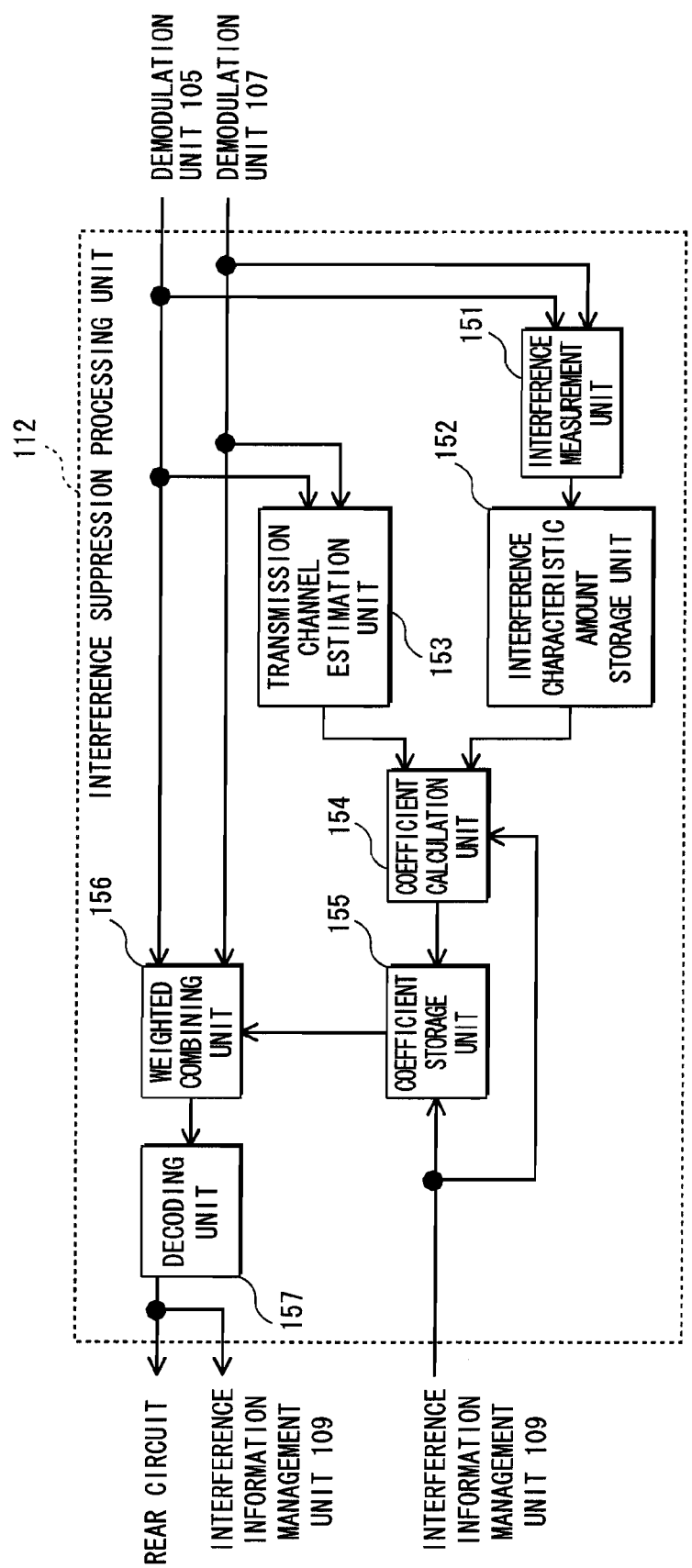
FIG. 6 shows the structure of an interference suppression processing unit shown in FIG. 5.

FIG. 6 shows the structure of the interference suppression processing unit 112 shown in FIG. 5.

The interference suppression processing unit 112 includes an interference measurement unit 151, an interference characteristic amount storage unit 152, a transmission channel estimation unit 153, a coefficient calculation unit 154, a coefficient storage unit 155, a weighted combining unit 156, and a decoding unit 157.

While an interference signal is being detected, the interference measurement unit 151 measures a characteristic amount of the interference signal based on a received signal. As the characteristic amount of the interference signal, the signal correlation among a plurality of antennas can be employed, for example.

The interference characteristic amount storage unit 152 stores therein the characteristic amount of the interference signal measured by the interference measurement unit 151.

The transmission channel estimation unit 153 estimates a transmission channel using a training symbol included in a received signal. When a training symbol is included in the received signal, the received signal has a high possibility of being a desired signal. Accordingly, the interference suppression processing unit 112 starts performing interference suppression processing.

Based on the information indicating the interference signal that needs to be suppressed input by the interference information management unit 109, the coefficient calculation unit 154 reads, from the interference characteristic amount storage unit 152, a characteristic amount of the interference signal that needs to be suppressed. Based on the read characteristic amount of the interference signal, the coefficient calculation unit 154 adjusts amplitudes and phases of received signals input by the demodulation units 105 and 107, and equalizes variation in the transmission channel to calculate a weighting coefficient for reducing components of the interference signal based on an estimation result of the transmission channel estimated by the transmission channel estimation unit 153.

The coefficient calculation unit 154 can perform the coefficient calculation in the same manner as the method used for adaptive array processing, for example. Specifically, it is preferable to use a method of determining a coefficient so as to maximize the ratio of desired signals to interference signals. However, other methods may be used, such as the null-steering that minimizes the level of the interference signal, the beam-steering that maximizes the level of the desired signals, simple antenna-switching, and combinations or intermediates of these methods. Also, it is possible to use the above plural methods by switching between the methods. The simplest way is to use only a particular control method and make a judgment on whether the control method is effective or ineffective, as an operation of the interference suppression mode. However, it is also possible to allow switching among the plurality of methods and provide a structure that can use the plurality of the interference suppression modes. If this is the case, although the processing is slightly complicated, the flexibility realizes appropriate mode selection even if there are other interference sources in addition to the subject interference station.

Note that although the interference suppression processing unit 112 is described above as a unit that follows the demodulation units 105 and 107 and performs processing on the baseband signals, the interference suppression processing unit 112 may be structured to adjust amplitudes and phases of the radio-frequency signals and the intermediate-frequency signals on a front circuit of the demodulation units 105 and 107 to combine the signals. Also, in the case of handling multi-carrier signals such as the OFDM (Orthogonal Frequency Division Multiplexing) signals, it is possible to perform more precise combining processing by multiplexing each sub-carrier by the coefficient.

The coefficient calculation unit 155 stores therein a coefficient calculated by the coefficient calculation unit 154.

The weighted combining unit 156 reads, from the coefficient storage unit 155, a coefficient relating to an interference signal that needs to be suppressed. The weighted combining unit 156 combines data symbols included in received signals input by the demodulation units 105 and 107 with the weighting coefficients, and reduces the level of the interference signal to equalize variation in the transmission channel.

The decoding unit 157 decodes the weighted combined data symbols input by the weighted combining unit 156, and outputs data acquired as a result of the decoding (decoded data) to a rear circuit, and also outputs interference information included in a header of the decoded data and a power level at which the decoded data is received to the interference information management unit 109.

<Flow of Processing Performed by Wireless Communication Apparatus>

Figure 7:
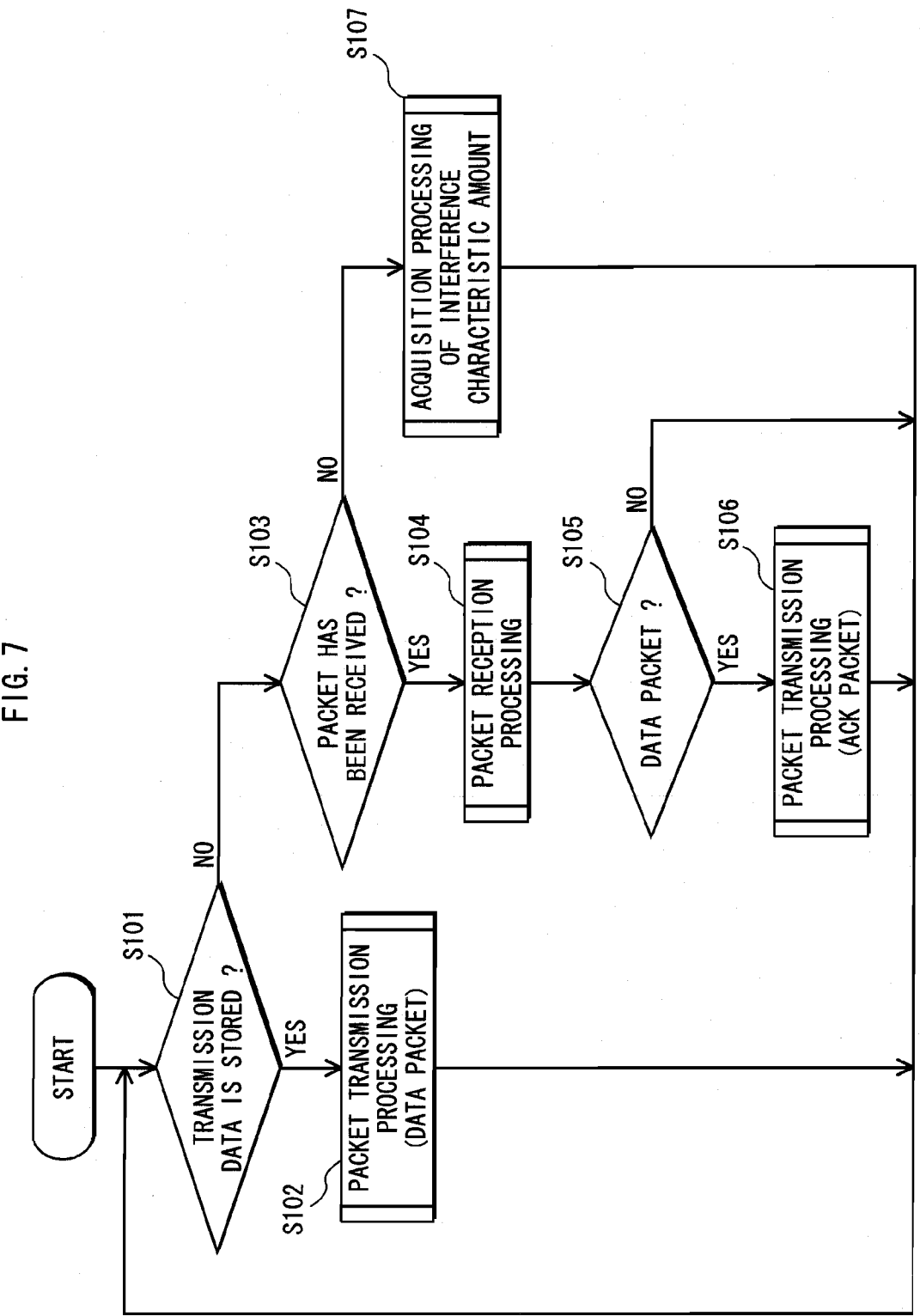
FIG. 7 is a flow chart showing a flow of packet transmission/reception processing performed by the wireless communication apparatus according to the first embodiment.

FIG. 7 is a flow chart showing packet transmission/reception processing performed by the wireless communication apparatus 11A shown in FIG. 1. Note that a flow of processing performed by the wireless communication apparatus 12A is the same as that of the wireless communication apparatus 11A.

The wireless communication apparatus 11A judges whether the wireless communication apparatus 11A stores therein transmission data (Step S101). If the wireless communication apparatus 11A stores therein the transmission data (Step S101: YES), the wireless communication apparatus 11A performs packet transmission processing for transmitting a data packet (Step S102), and then the flow returns to Step S101.

If not storing therein transmission data (Step S101: NO), the wireless communication apparatus 11A judges whether a packet has been received (Step S103). If the packet has been received (Step S103: YES), the interference suppression processing unit 112 performs, for example, processing for suppressing an interference signal superimposed on a desired signal to perform processing for receiving the packet (Step S104).

Then, the wireless communication apparatus 11A judges whether the received packet is a data packet (Step S105). If the received packet is not a data packet (Step S105: NO), the flow returns to Step S101. If the received packet is a data packet (Step S105: YES), the wireless communication apparatus 11A performs packet transmission processing for transmitting the ACK packet (Step S106), and then the flow returns to Step S101.

If the packet has not been received (Step S103: NO), the interference suppression processing unit 112 of the wireless communication apparatus 11A performs processing for acquiring a characteristic amount of an interference signal (Step S107), and then the flow returns to Step S101.

<Flow of Packet Transmission Processing>

Figure 8:
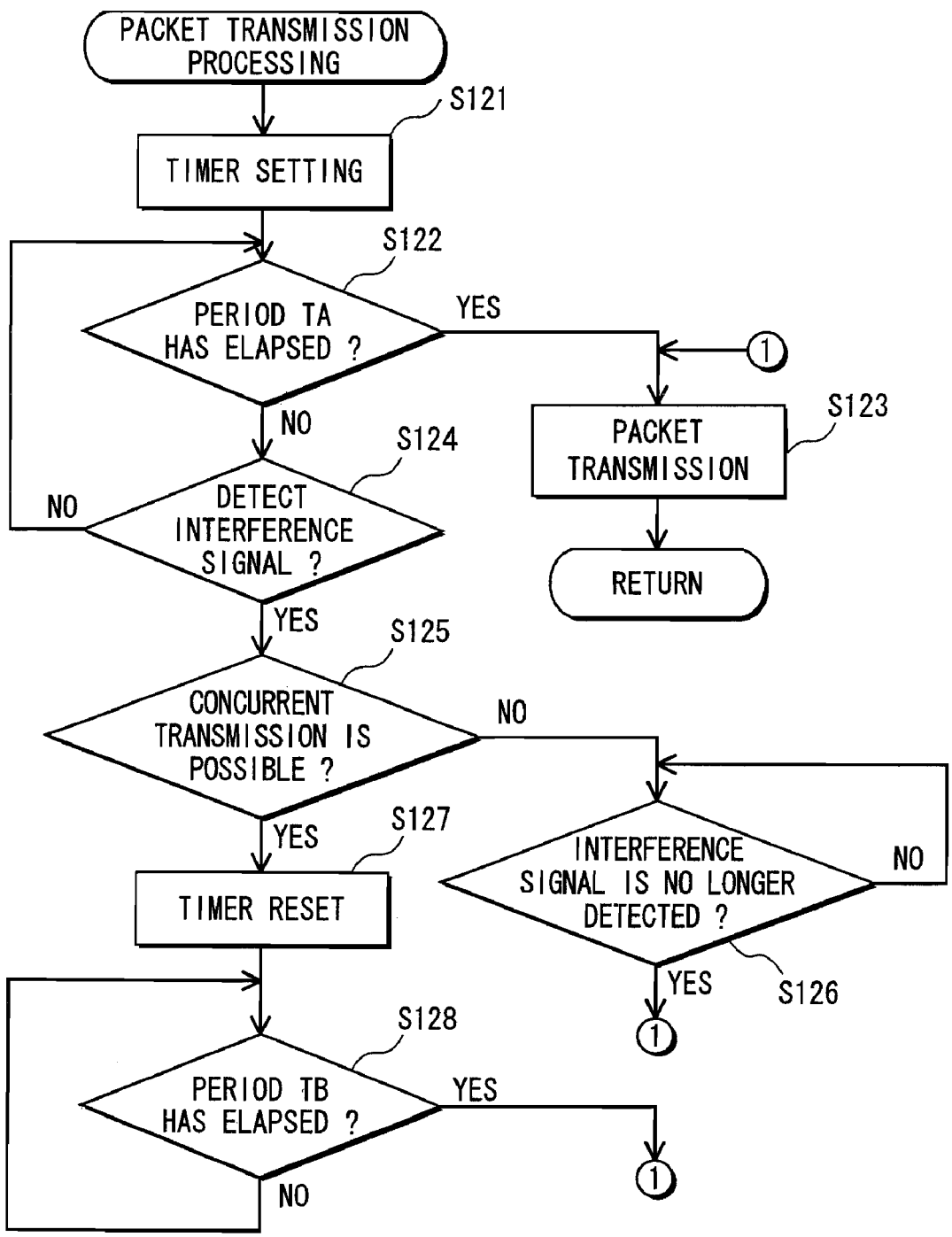
FIG. 8 is a flow chart showing a flow of the packet transmission processing shown in FIG. 7.

FIG. 8 is a flow chart showing a flow of the packet transmission processing shown in FIG. 7 (Steps S102 and S106). Note that packet transmission processing of data packets is substantially the same as packet transmission processing of ACK packets in a point with respect to the present invention. Accordingly, both of the packet transmission processing is collectively described.

The transmission timing control unit 111 sets a timer which is not shown in the figure (Step S121).

Based on an elapsed time measured by the timer, the transmission timing control unit 111 judges whether the period TA has elapsed since transmission of the packet has been determined (Step S122).

When the period TA has elapsed since the transmission of the packet has been determined (Step S122: YES), the transmission timing control unit 111 transmits a packet transmission instruction to the packet generation unit 101. Upon receiving the packet transmission instruction transmitted by the transmission timing control unit 111, the packet generation unit 101 outputs a generated packet to the modulation unit 102. The modulation unit 102 modulates the packet to a radio frequency band. The packet modulated to the radio frequency band is output from the antenna 104 (Step S123). Then, the flow returns to the processing shown in FIG. 7.

If the interference detection unit 108 detects an interference signal (Step S124: YES) before the period TA has elapsed since the transmission of the packet has been determined (Step S122: NO), the concurrent transmission judgment unit 110 judges whether it is possible to transmit the packet concurrently with the interference signal (Step S125).

If it is impossible to transmit the packet concurrently with the interference signal (Step S125: NO), when the interference detection unit 108 no longer detects the interference signal (Step S126: YES), the processing of Step S123 is performed to output the packet from the antenna 104. Then, the flow returns to the processing shown in FIG. 7. If it is impossible to transmit the packet concurrently with the interference signal, transmission of the packet may be determined when the interference signal is no longer detected, and then the flow may return to Step S121, for example.

If it is possible to transmit the packet concurrently with the interference signal (Step S125: YES), the concurrent transmission judgment unit 110 outputs, to the transmission timing control unit 111, a concurrent transmission signal indicating that the concurrent transmission is possible. Upon receiving the concurrent transmission signal indicating that the concurrent transmission is possible, the transmission timing control unit 111 resets the timer which is not shown in the figure (Step S127).

Based on an elapsed time measured by the timer, the transmission timing control unit 111 judges whether the period TB has elapsed since the interference signal has been detected (Step S128).

When the period TB has elapsed since the interference signal has been detected (Step S128: YES), the processing of Step S123 is performed to output the packet from the antenna 104. Then, the flow returns to the processing shown in FIG. 7.

First Modification of First Embodiment

The following describes a first modification of the first embodiment with reference to the drawings.

In the first modification of the first embodiment, if a new interference signal is detected before the period TB has elapsed since an interference signal has been detected, a packet is transmitted at a time when the period TB has elapsed since the new interference signal has been detected.

<Transmission Sequence Example>

Figure 9:
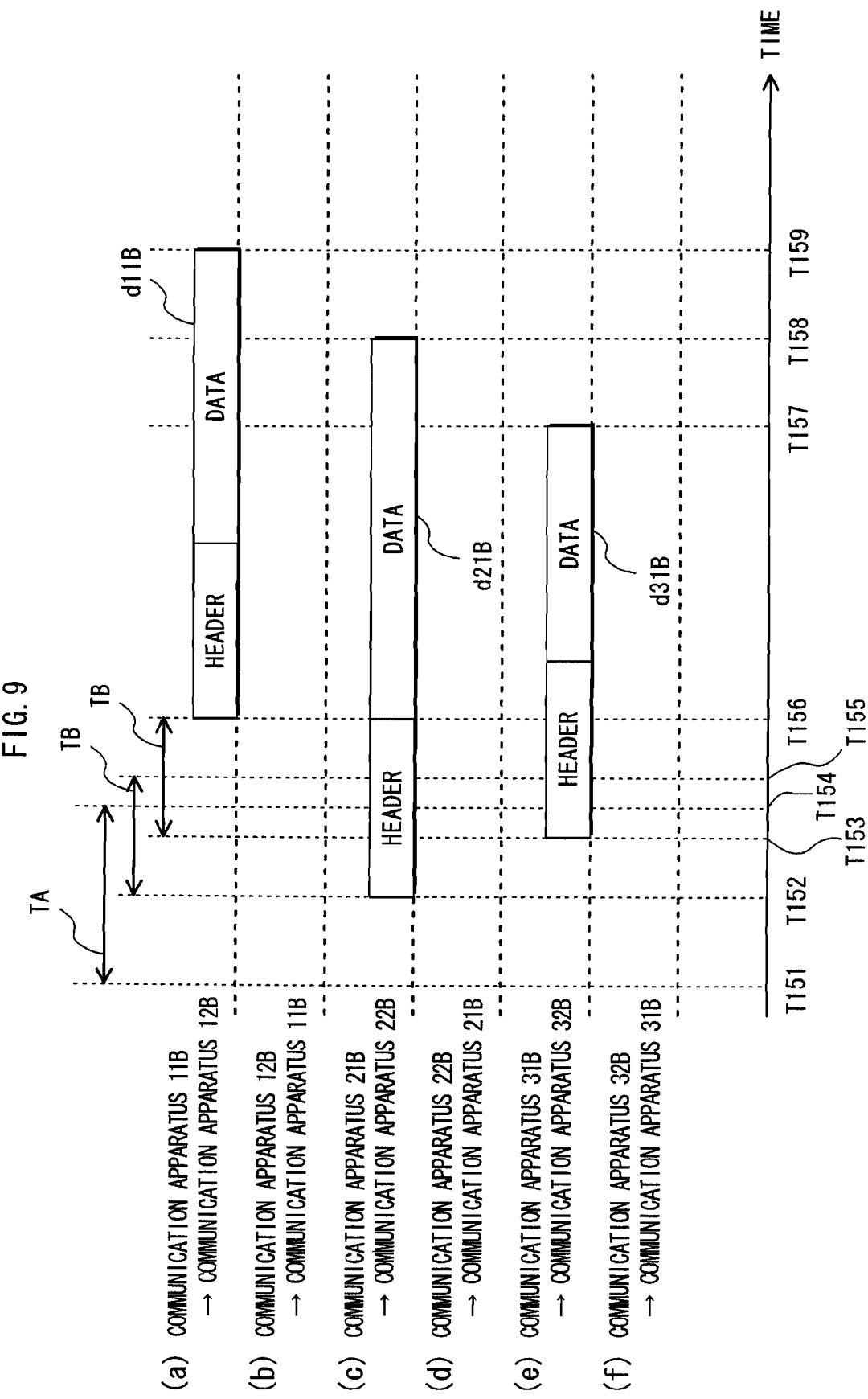
FIG. 9 shows an example of a transmission sequence of a wireless communication system according to a first modification of the first embodiment.

FIG. 9 shows an example of a transmission sequence of a wireless communication system according to the first modification of the first embodiment.

In the transmission sequence shown in FIG. 9, wireless communication apparatuses 11B and 12B perform communications with each other. Wireless communication apparatus 21B and 22B perform communications with each other. Wireless communication apparatus 31B and 32B perform communications with each other.

Note that each of the wireless communication apparatuses 11B and 12B operates as the wireless communication apparatus of the present invention, and also operates as a receiver having a function of suppressing an interference signal included in a received signal to acquire a desired signal by receiving the interference signal in advance for a predetermined period. The wireless communication apparatuses 21B, 22B, 31B, and 32B are interference sources of the wireless communication apparatuses 11B and 12B.

At a time T151, the wireless communication apparatus 11B determines to transmit a data packet, and then performs interference signal detection for the period TA.

At a time T152 included in the period TA for which the wireless communication apparatus 11B performs interference signal detection, the wireless communication apparatus 21B starts transmitting a data packet d21B to the wireless communication apparatus 22B. At a time T158, the wireless communication apparatus 21B completes the transmission of the data packet d21B.

At the time T152 preceding a time T154 at which the period TA has elapsed since the time T151, the wireless communication apparatus 11B detects the data packet d21B (an interference signal). The wireless communication apparatus 11B judges whether it is possible to transmit a data packet concurrently with the interference signal. In this transmission sequence, the wireless communication apparatus 11B judges that it is possible to transmit the data packet concurrently with the interference signal.

Until the period TB has elapsed since the time 152 at which the interference signal has been detected, the wireless communication apparatus 11B waits to transmit the data packet and further performs interference signal detection.

At a time T153 included in the period for which the wireless communication apparatus 11B waits to transmit the data packet, the wireless communication apparatus 31B starts transmitting a data packet d31B to the wireless communication apparatus 32B. At a time T157, the wireless communication apparatus 31B completes the transmission of the data packet d31B.

At the time T153 preceding a time T155 at which the period TB has elapsed since the time T152, the wireless communication apparatus 11B detects the data packet d31B (an interference signal). The wireless communication apparatus 11B judges whether it is possible to transmit the data packet concurrently with the interference signal. In this transmission sequence, the wireless communication apparatus 11B judges that it is possible to transmit the data packet concurrently with the interference signal.

Until the period TB has elapsed since the time T153 at which the interference signal has been detected, the wireless communication apparatus 11B waits to transmit the data packet and further performs interference signal detection.

For the period TB from the time T153 to a time T156, the wireless communication apparatus 11B does not detect an interference signal. At the time T156, the wireless communication apparatus 11B starts transmitting the data packet d11B to the wireless communication apparatus 12B. At a time T159, the wireless communication apparatus 11B completes the transmission of the data packet d11B.

Note that the apparatus structure and the flow of the packet transmission/reception processing according to the first modification of the first embodiment are substantially the same as the apparatus structure shown in FIG. 5 and the flow shown in FIG. 7, respectively. Accordingly, the following describes a flow of the packet transmission processing (of data packets) and the packet transmission processing (of ACK packets) shown in FIG. 7.

<Flow of Packet Transmission Processing>

Figure 10:
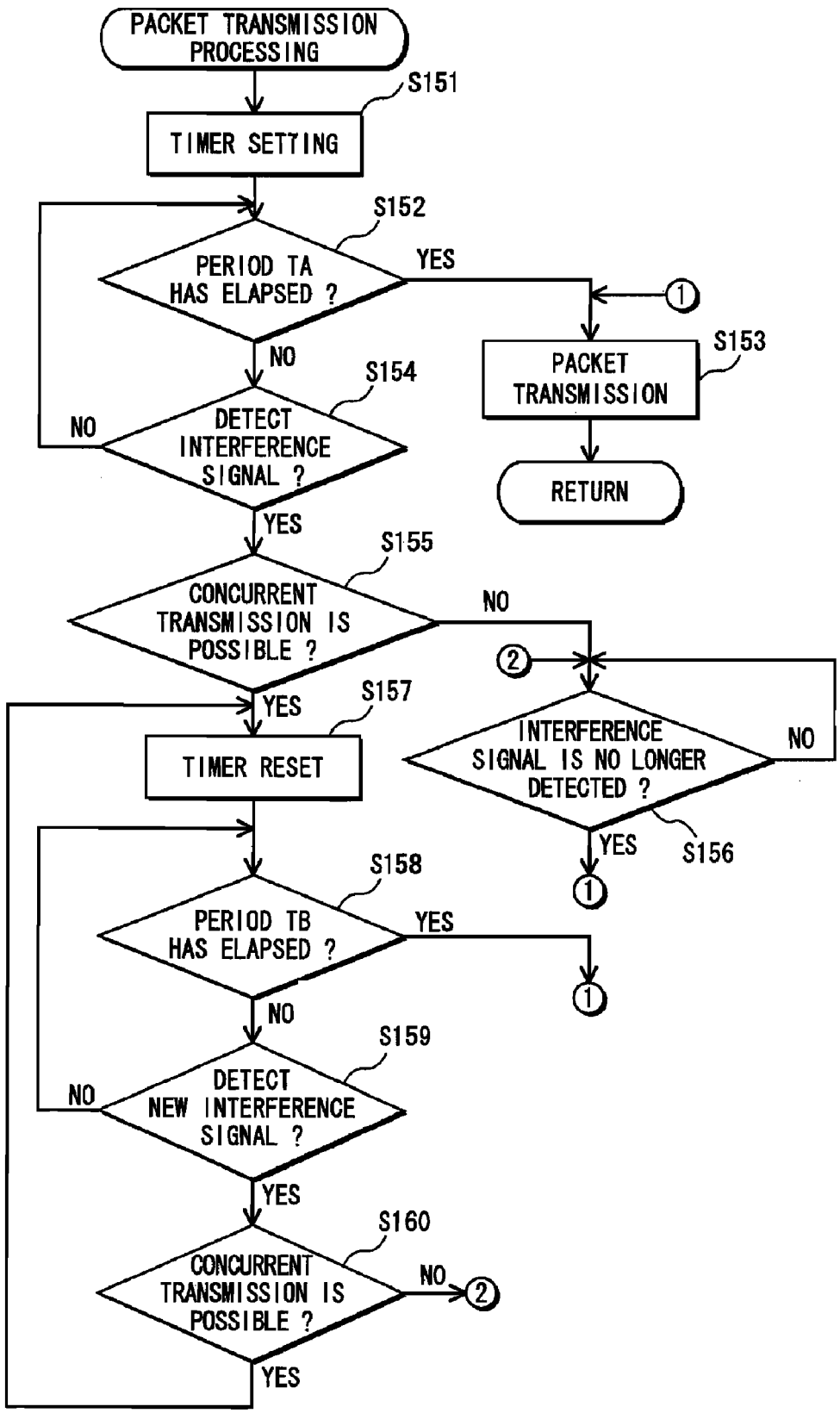
FIG. 10 is a flow chart showing a flow of packet transmission processing according to the first modification of the first embodiment.

FIG. 10 is a flow chart showing the flow of the packet transmission processing according to the first modification of the first embodiment.

The wireless communication apparatus 11B performs processing of Steps S151 to S157 which is substantially the same as the processing of Steps S121 to S127.

Based on an elapsed time measured by the timer, the transmission timing control unit 111 judges whether the period TB has elapsed since an interference signal has been detected (Step S158).

When the period TB has elapsed since the interference signal has been detected (Step S158: YES), the processing of Step S153 is performed to output a packet from the antenna 104.

If the interference detection unit 108 detects a new interference signal (Step S159: YES) before the period TB has elapsed since the interference signal has been detected (Step S158: NO), the concurrent transmission judgment unit 110 judges whether it is possible to transmit the packet concurrently with the new interference signal (Step S160).

If it is impossible to transmit the packet concurrently with the new interference signal (Step S160: NO), when the interference detection unit 108 can no longer detect the new interference signal (Step S156: YES), the processing of Step S153 is performed to output the packet from the antenna 104.

If it is possible to transmit the packet concurrently with the new interference signal (Step S160: YES), the concurrent transmission judgment unit 110 outputs, to the transmission timing control unit 111, a concurrent transmission signal indicating that the concurrent transmission is possible. Upon receiving the concurrent transmission signal indicating that the concurrent transmission is possible, the transmission timing control unit 111 resets the timer which is not shown in the figure (Step S157). Then, processing of Step S158 and subsequent Steps is performed.

Second Modification of First Embodiment

The following describes a second modification of the first embodiment with reference to the drawings.

In the second modification of the first embodiment, it is judged whether a received signal that has been decoded is an interference signal using a destination address included in a header of the received signal, which has been decoded as a result of the decoding of the received signal.

<Structure of Wireless Communication Apparatus>

Figure 11:
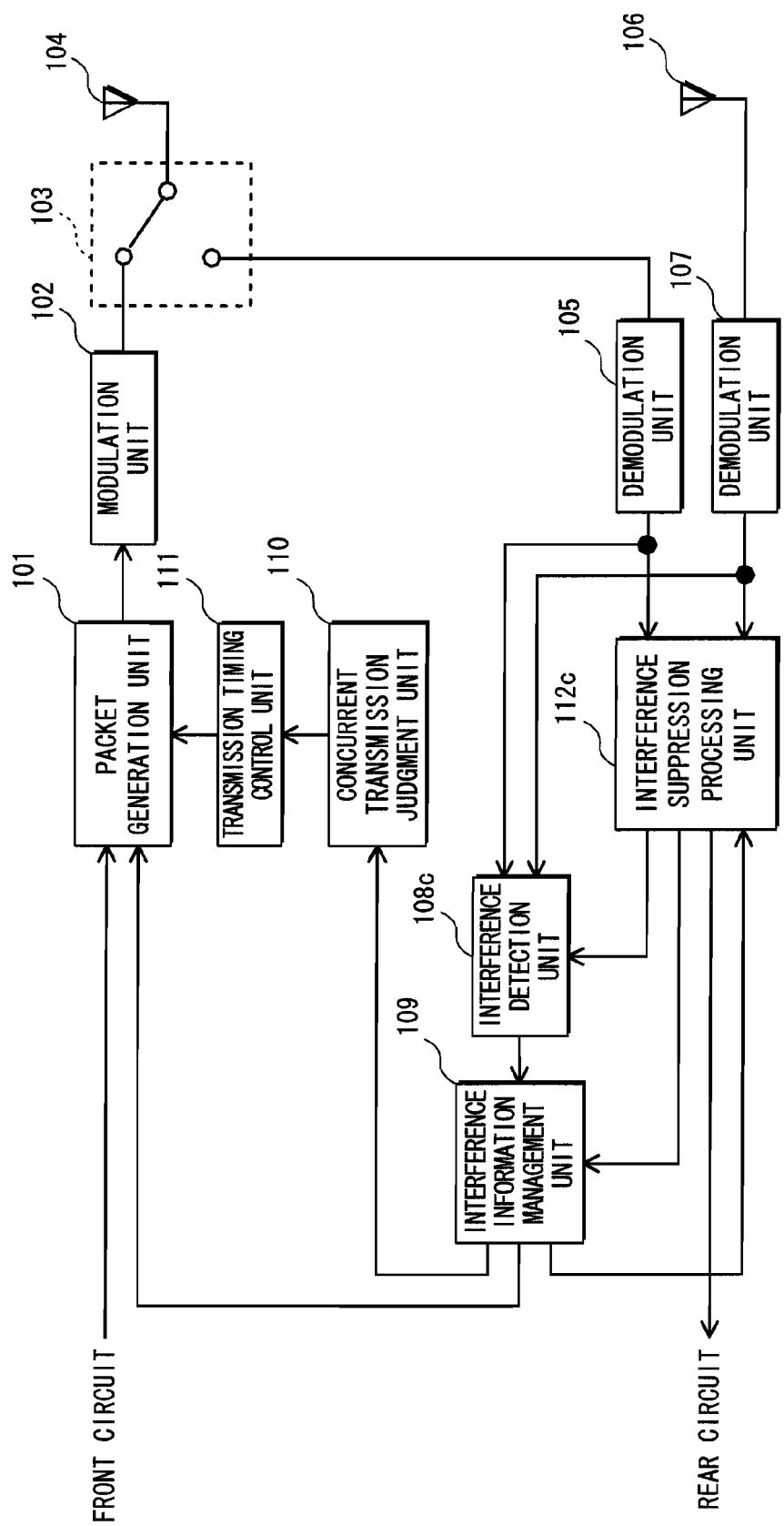
FIG. 11 shows the apparatus structure of a wireless communication apparatus according to a second modification of the first embodiment.

FIG. 11 shows the apparatus structure of a wireless communication apparatus according to the second modification of the first embodiment. Compositional elements according to this modification having substantially the same functions as the compositional elements according to the first embodiment have the same reference letters of those according to the first embodiment. The explanation of the first embodiment is applicable to this modification. Accordingly, the explanation of the compositional elements according to this modification is omitted here.

The wireless communication apparatus includes a packet generation unit 101, a modulation unit 102, a switch circuit 103, antennas 104 and 106, demodulation units 105 and 107, an interference detection unit 108c, an interference information management unit 109, a concurrent transmission judgment unit 110, a transmission timing control unit 111, and an interference suppression processing unit 112c.

In addition to performing the processing of the interference suppression processing unit 112, the interference suppression processing unit 112c outputs, to the interference detection unit 108c, a destination address included in a header of decoded data on a channel that is the same as a channel through which the wireless communication apparatus transmits a packet (the same channel).

Based on the destination address input by the interference suppression processing unit 112c, the interference detection unit 108c judges whether a received signal is a desired signal or an interference signal. If the destination address input by the interference suppression processing unit 112c is not an address of the wireless communication apparatus, the interference detection unit 108c judges that the received signal is an interference signal, and outputs channel information of the interference signal and a power level at which the interference signal is received to the interference information management unit 109. Also, if the destination address input by the interference suppression processing unit 112c is the address of the wireless communication apparatus, the interference detection unit 108c judges that the received signal is a desired signal.

In this modification, for example, the interference detection unit 108c performs interference signal detection on the same channel based on the input by the demodulation unit 105. If the destination address input by the interference suppression processing unit 112c is not the address of the wireless communication apparatus, the interference detection unit 108c judges that the signal input by the demodulation unit 105 is an interference signal, and outputs channel information indicating a channel of the interference signal and a power level at which the interference signal is received to the interference information management unit 109.

Second Embodiment

The following describes a second embodiment of the present invention with reference to the drawings.

In the first embodiment, for example, the wireless communication apparatus 21A transmits the data packet d21 to the wireless communication apparatus 22A. The wireless communication apparatus 11A detects the data packet d21. After the period TB has elapsed since the wireless communication apparatus 11A has detected the data packet d21, the wireless communication apparatus 11A transmits the data packet d11 to the wireless communication apparatus 12A.

Suppose that while the wireless communication apparatus 11A transmits the data packet d11 to the wireless communication apparatus 12A, the wireless communication apparatus 21A completes the transmission of the data packet d21, and the wireless communication apparatus 22A transmits the ACK packet a22 to the wireless communication apparatus 21A.

In this case, the wireless communication apparatus 12A will receive the data packet d11 (a desired signal) transmitted by the wireless communication apparatus 11A on which the ACK packet a22 (an interference signal) transmitted by the wireless communication apparatus 22A has been superimposed.

However, the wireless communication apparatus 12A has not yet acquired a characteristic amount of the ACK packet a22 (the interference signal).

Accordingly, the wireless communication apparatus 12A cannot suppress the interference signal included in a received signal.

In view of this problem, the second embodiment includes, in addition to the functions described in the first embodiment, a function of controlling a length of a packet to be transmitted at a time in accordance with a reception status of interference signals.

Note that each of wireless communication apparatuses 11D and 12D operates as the wireless communication apparatus of the present invention, and also operates as a receiver having a function of suppressing an interference signal included in a received signal by receiving the interference signal in advance for a predetermined period. Wireless communication apparatuses 21D and 22D are interference sources of the wireless communication apparatuses 11D and 12D.

Here, before describing the structure and processing flow of the wireless communication apparatuses 11D and 12D, a specific example of a transmission sequence of the wireless communication system is described.

<Transmission Sequence Example (1)>

Figure 12:
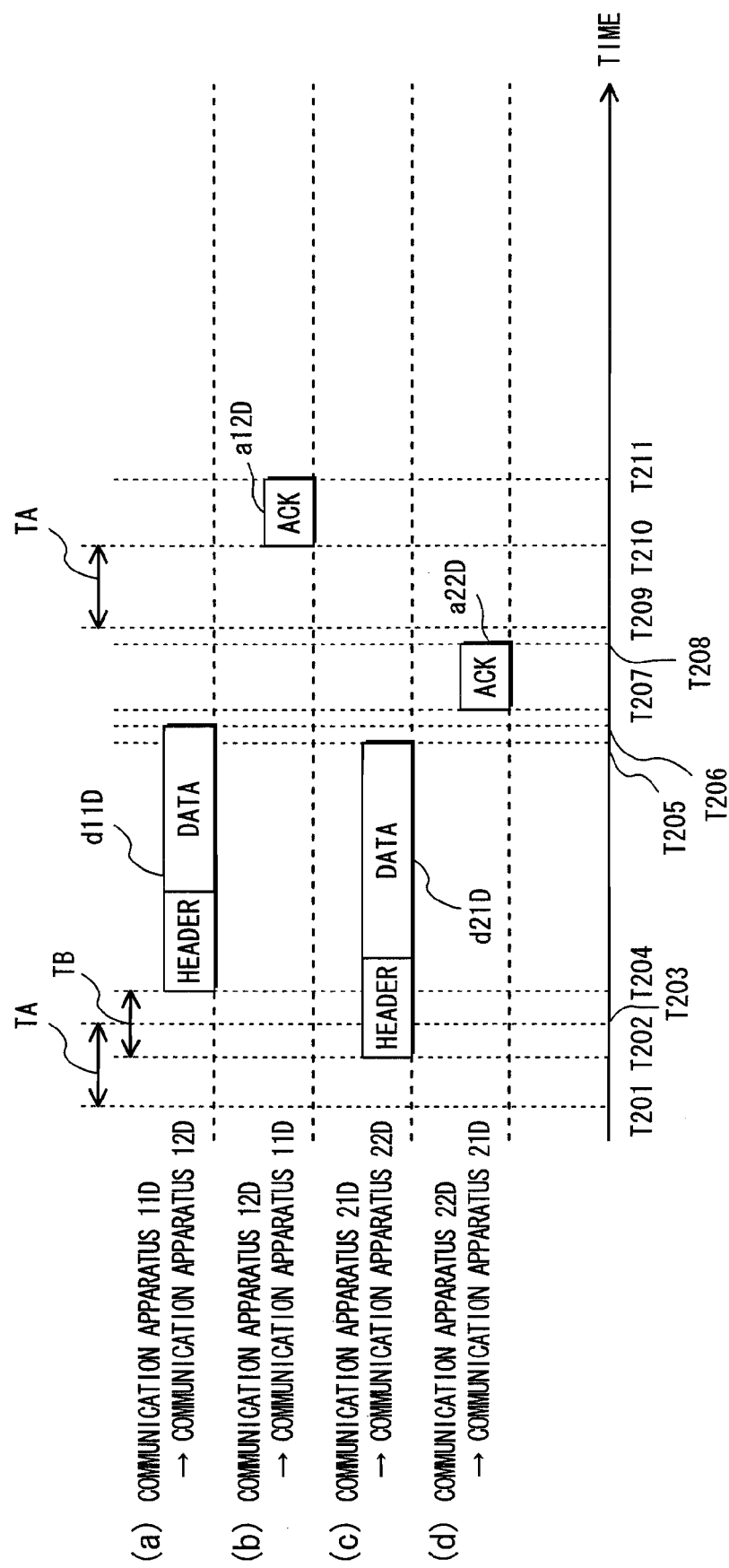
FIG. 12 shows an example of a transmission sequence of a wireless communication system according to a second embodiment.

FIG. 12 shows an example of a transmission sequence of the wireless communication system according to the second embodiment. Note that, in the transmission sequence shown in FIG. 12, a time at which transmission of a packet completes in a case where the packet is completely transmitted (hereinafter a "transmission completion time") precedes a time at which an interference signal that has been detected can no longer be detected and a next interference signal is expected to arrive (hereinafter an "expected arrival time").

At a time T201, the wireless communication apparatus 11D determines to transmit the data packet, and then performs interference signal detection for the period TA.

At a time T202 included in the period TA for which the wireless communication apparatus 11D performs interference signal detection, the wireless communication apparatus 21D starts transmitting a data packet d21D to the wireless communication apparatus 22D. At a time T205, the wireless communication apparatus 21D completes the transmission of the data packet d21D. For a period from a time T207 to a time T208, the wireless communication apparatus 22D transmits an ACK packet a22D to the wireless communication apparatus 21D, as a response to the data packet d21D.

At the time 1202 preceding a time 1203 at which the period TA has elapsed since the time T201, the wireless communication apparatus 11D detects the data packet d21D (an interference signal). The wireless communication apparatus 11D judges whether it is possible to transmit a data packet concurrently with the interference signal. In this transmission sequence, the wireless communication apparatus 11D judges that it is possible to transmit the data packet concurrently with the interference signal.

At a time 204 when the period TB has elapsed since the time T202 at which the interference signal has been detected, the wireless communication apparatus 11D starts transmitting the data packet d11D to the wireless communication apparatus 12D. While transmitting the data packet d11D, the wireless communication apparatus 11D continues to detect the interference signal.

At the time T205, the wireless communication apparatus 11D can no longer detect the data packet d21D (the interference signal), and estimates a time when a next interference signal is expected to arrive (an expected arrival time), and estimates a time at which transmission of the data packet d11D completes in a case where the data packet d11D continues to be transmitted. The wireless communication apparatus 11D compares the transmission completion time with the expected arrival time. In this transmission sequence, the wireless communication apparatus 11D judges that the expected arrival time follows the transmission completion time.

When the interference signal no longer arrives at the wireless communication apparatus 11D, a power level at which the interference signal is received decreases. Accordingly, based on the decrease of the power level, the wireless communication apparatus 11D detects that the interference signal no longer arrives.

In a communication protocol in which an ACK packet is transmitted in response to a data packet, for example, it is possible to estimate an expected arrival time based on a period required for transmitting ACK packets in response to data packets. Alternatively, it may be possible to store a history of arrival intervals of interference signals, and estimate an expected arrival time based on the history.

The wireless communication apparatus 11D does not divide the data packet d11D, and continues to transmit the data packet d11D. At a time T206, the wireless communication apparatus 11D completes the transmission of the data packet d11D.

At a time T209, the wireless communication apparatus 12D determines to transmit an ACK packet as a response to the data packet d11D, and performs interference signal detection for the period TA.

For the period TA from the time T209 to a time T210, the wireless communication apparatus 11B does not detect an interference signal. At the time T210, the wireless communication apparatus 12D starts transmitting an ACK packet a12D to the wireless communication apparatus 11D. At a time T211, the wireless communication apparatus 12D completes the transmission of the ACK packet a12D.

<Transmission Sequence Example (2)>

Figure 13:
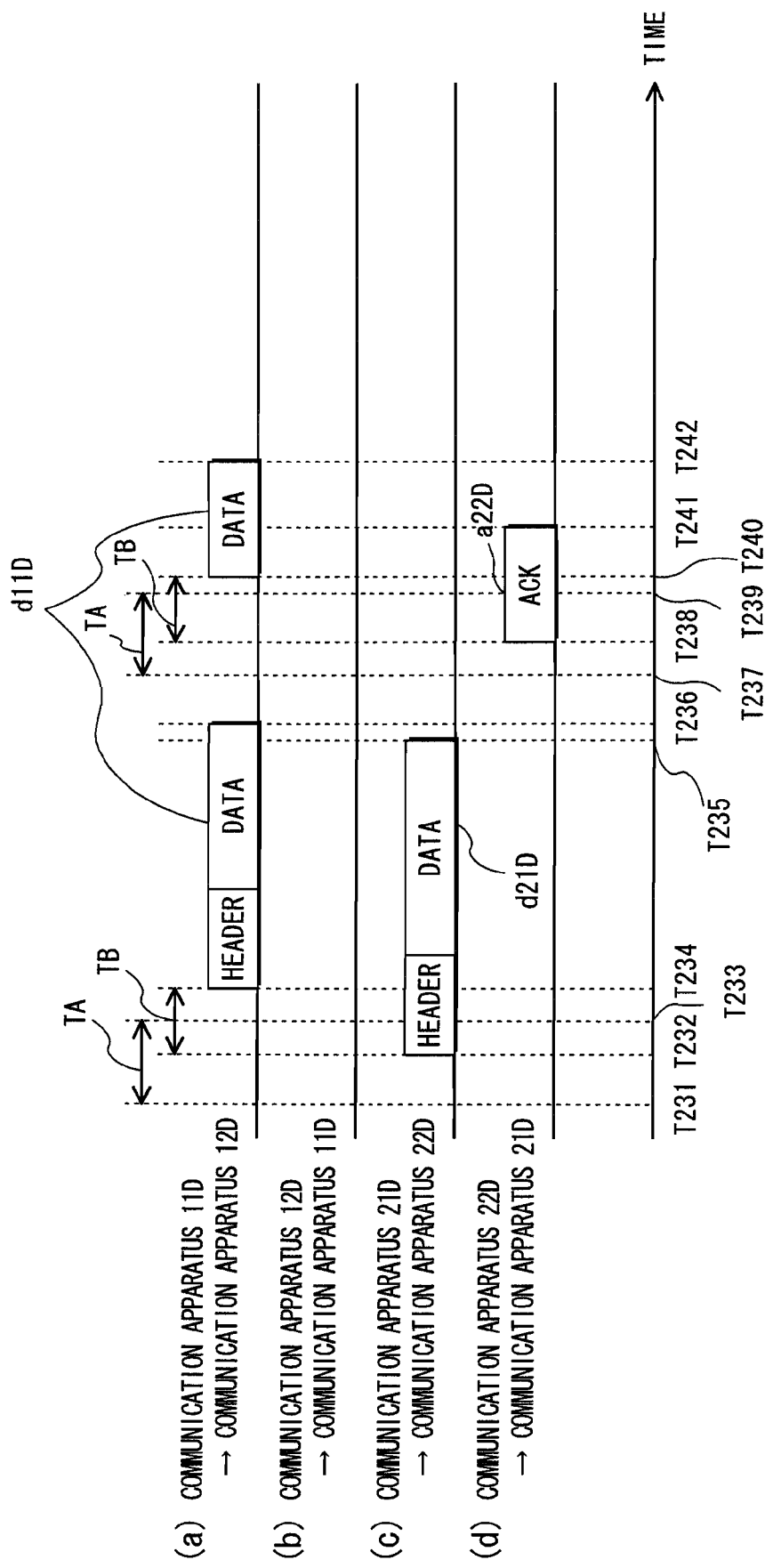
FIG. 13 shows another example of the transmission sequence of the wireless communication system according to the second embodiment.

FIG. 13 shows another example of the transmission sequence of the wireless communication system according to the second embodiment. Note that, in the transmission sequence shown in FIG. 13, a time at which transmission of a packet completes in a case where the packet is completely transmitted follows a time at which an interference signal can no longer be detected and a next interference signal is expected to arrive.

At a time T231, the wireless communication apparatus 11D determines to transmit a data packet, and then performs interference signal detection for the period TA.

At a time T232 included in the period TA for which the wireless communication apparatus 11D performs the interference signal detection, the wireless communication apparatus 21D starts transmitting a data packet d21D to the wireless communication apparatus 22D. At a time T235, the wireless communication apparatus 21D completes the transmission of the data packet d21D. For a period from a time T238 to a time T241, the wireless communication apparatus 22D transmits an ACK packet a22D to the wireless communication apparatus 21D, as a response to the data packet d21D.

At a time T232 preceding a time T233 at which the period TA has elapsed since the time T231, the wireless communication apparatus 11D detects the data packet d21D (an interference signal). The wireless communication apparatus 11D judges whether it is possible to transmit the data packet concurrently with the interference signal. In this transmission sequence, the wireless communication apparatus 11D judges that it is possible to transmit the data packet concurrently with the interference signal.

At a time T234 when the period TB has elapsed since the time T232 at which the interference signal has been detected, the wireless communication apparatus 11D starts transmitting the data packet d11D to the wireless communication apparatus 12D. While transmitting the data packet d11D, the wireless communication apparatus 11D continues to detect the interference signal.

At the time T235, the wireless communication apparatus 11D can no longer detect the data packet d21D (the interference signal), and estimates a time when a next interference signal is expected to arrive (an expected arrival time), and estimates a time at which the wireless communication apparatus 11D completes transmission of the data packet d11D in a case where the wireless communication apparatus 11D continues to transmit the data packet d11D (a transmission completion time). The wireless communication apparatus 11D compares the transmission completion time with the expected arrival time. In this transmission sequence, the wireless communication apparatus 11D judges that the expected arrival time precedes the transmission completion time.

The wireless communication apparatus 11D determines to divide the data packet d11D into subpackets. At a time T236, the wireless communication apparatus 11D temporarily suspends transmission of the data packet d11D.

In order to notify a wireless communication apparatus on the receiving side of the division of the data packet d11D into the subpackets, the wireless communication apparatus 11D may insert, into at least one of the two subpackets acquired as a result of division of the data packet d11D, a predetermined symbol indicating that the data packet d11D has been divided. Alternatively, the wireless communication apparatus 11D may divide the data packet d11D into two subpackets and temporarily suspend transmission of the data packet d11D, and then transmit a known symbol in a predetermined pattern to the wireless communication apparatus 12D for notifying the wireless communication apparatus 12D of the division of the data packet d11D. Note that the same applies to a case of division of an ACK packet.

At a time T237 based on the expected arrival time, the wireless communication apparatus 11D determines to restart transmitting the data packet d11D, and then performs interference signal detection for the period TA.

At the time T238 preceding a time T239 at which the period TA has elapsed since the time T237, the wireless communication apparatus 11D detects the ACK packet a22D (an interference signal). The wireless communication apparatus 11D judges whether it is possible to transmit the data packet concurrently with the interference signal. In this transmission sequence, the wireless communication apparatus 11D judges that it is possible to transmit the data packet concurrently with the interference signal.

At a time T240 when the period TB has elapsed since the time T238 at which the interference signal has been detected, the wireless communication apparatus 11D restarts transmitting the subpacket of the data packet d11D to the wireless communication apparatus 12D, and continues to detect the interference signal.

At a time T241, the wireless communication apparatus 11D can no longer detect the ACK packet a22D (the interference signal), and estimates a time when a next interference signal is expected to arrive (an expected arrival time), and estimates a time at which the wireless communication apparatus 11D completes transmission of the subpacket of the data packet d11D in a case where the wireless communication apparatus 11D continues to transmit the subpacket of the data packet d11D (a transmission completion time). The wireless communication apparatus 11D compares the transmission completion time with the expected arrival time. In this transmission sequence, the wireless communication apparatus 11D judges that the expected arrival time follows the transmission completion time.

The wireless communication apparatus 11D does not further divide the subpacket of the data packet d11D, and continues to transmit the subpacket of the data packet d11D. Then, at a time T242, the wireless communication apparatus 11D completes the transmission of the subpacket of the data packet d11D. Based on the predetermined symbol inserted into the one of the subpackets of the data packet d11D for example, the wireless communication apparatus 12D recognizes that the data packet d11D has been divided into the subpackets, and combines the subpackets of the data packet d11D into one, and performs decoding processing and the like on the combined subpackets of the data packet d11D.

Note that when the predetermined symbol is not inserted into one of the subpackets, or when the known symbol in the predetermined pattern is not transmitted, the wireless communication apparatus 12D can recognize the division of the data packet in the following manner, for example.

The wireless communication apparatus 12D compares a length of a packet included in a header of the data packet with a length of a received data packet. If the length included in the header is greater than the length of the received data packet, the wireless communication apparatus 12D judges that the data packet has been divided into subpackets.

<Structure of Wireless Communication Apparatus>

Figure 14:
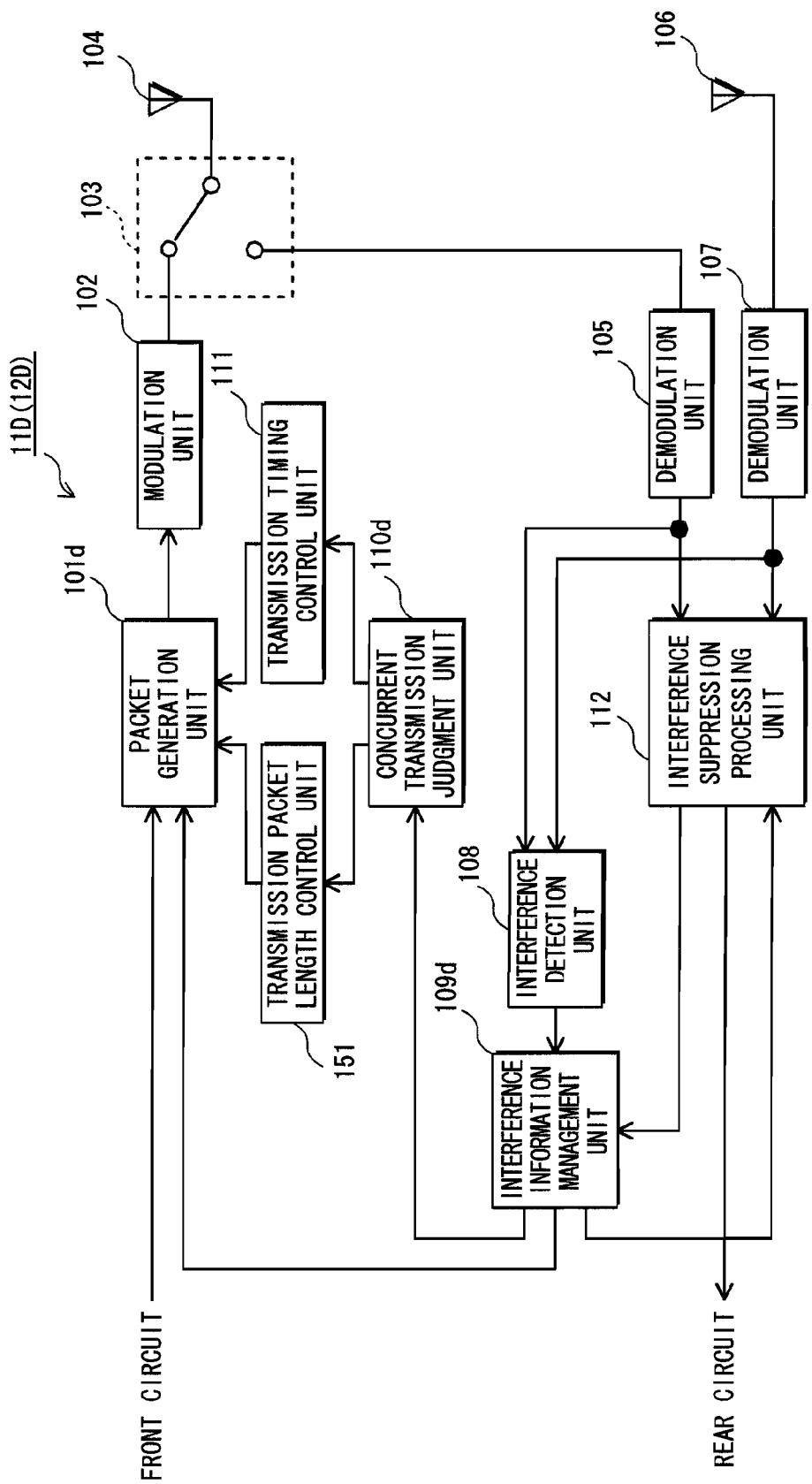
FIG. 14 shows the apparatus structure of a wireless communication apparatus according to the second embodiment.

FIG. 14 shows the apparatus structure of the wireless communication apparatus 11D according to the second embodiment. Note that the wireless communication apparatus 12D has the same structure as the wireless communication apparatus 11D. Compositional elements according to the second embodiment having substantially the same functions as the compositional elements according to the first embodiment have the same reference letters of those according to the first embodiment. The explanation of the first embodiment is applicable to the second embodiment. Accordingly, the explanation of the compositional elements according to the second embodiment is omitted here.

The wireless communication apparatus 11D includes a packet generation unit 101d, a modulation unit 102, a switch circuit 103, antennas 104 and 106, demodulation units 105 and 107, an interference detection unit 108, an interference information management unit 109d, a concurrent transmission judgment unit 110d, a transmission timing control unit 111, a transmission packet length control unit 151, and an interference suppression processing unit 112.

In addition to performing the processing of the packet generation unit 101, the packet generation unit 101d divides a packet being transmitted into two subpackets in accordance with a packet division instruction issued by the transmission packet length control unit 151. After dividing the packet into the subpackets, the packet generation unit 101d outputs one of the subpackets that has not been transmitted yet in accordance with a transmission instruction issued by the transmission timing control unit 111.

When the interference detection unit 108 can no longer detect an interference signal that has been detected and data stored in the interference information management unit 109d has been updated, the interference information management unit 109d outputs information indicating that the interference signal can no longer be detected to the concurrent transmission judgment unit 110d. Other processing performed by the interference information management unit 109d is the same as the processing performed by the interference information management unit 109.

In addition to performing the processing of the concurrent transmission judgment unit 110, upon receiving an input of information indicating that the interference signal can no longer be detected, the concurrent transmission judgment unit 110d transmits a notification indicating that completion of the interference signal detection to the transmission packet length control unit 151.

Upon receiving the notification of the completion of the interference signal detection, the transmission packet length control unit 151 estimates a time when a next interference signal is expected to arrive (an expected arrival time), and estimates a time when the wireless communication apparatus 11D completes transmission of a packet in a case where the wireless communication apparatus 11D continues to transmit the packet (a transmission completion time).

The transmission packet length control unit 151 compares the expected arrival time with the transmission completion time. If the expected arrival time precedes the transmission completion time, the transmission packet length control unit 151 instructs the packet generation unit 101d to temporarily suspend transmission of the packet and divide the packet into subpackets. That is, the transmission packet length control unit 151 controls a length of the packet to be transmitted at a time based on a result of the interference signal detection.

Note that the flow of the packet transmission/reception processing according to the second embodiment is substantially the same as the flow shown in FIG. 7. Accordingly, the following describes the flow of the packet transmission processing (of data packets) and the packet transmission processing (of ACK packets) shown in FIG. 7.

<Flow of Packet Transmission Processing>

Figure 15:
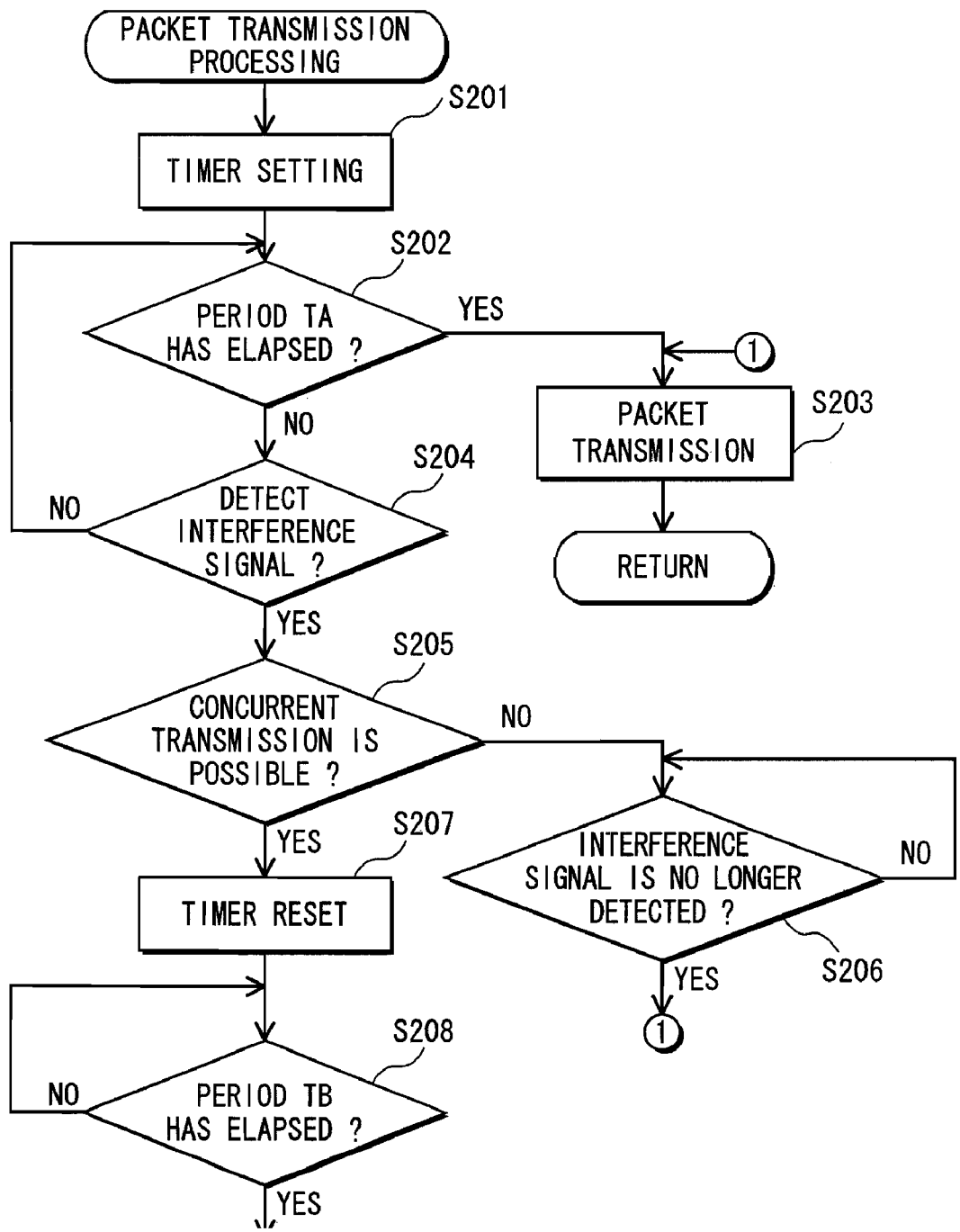
FIG. 15 is a flow chart showing a flow of packet transmission processing according to the second embodiment.
Figure 16:
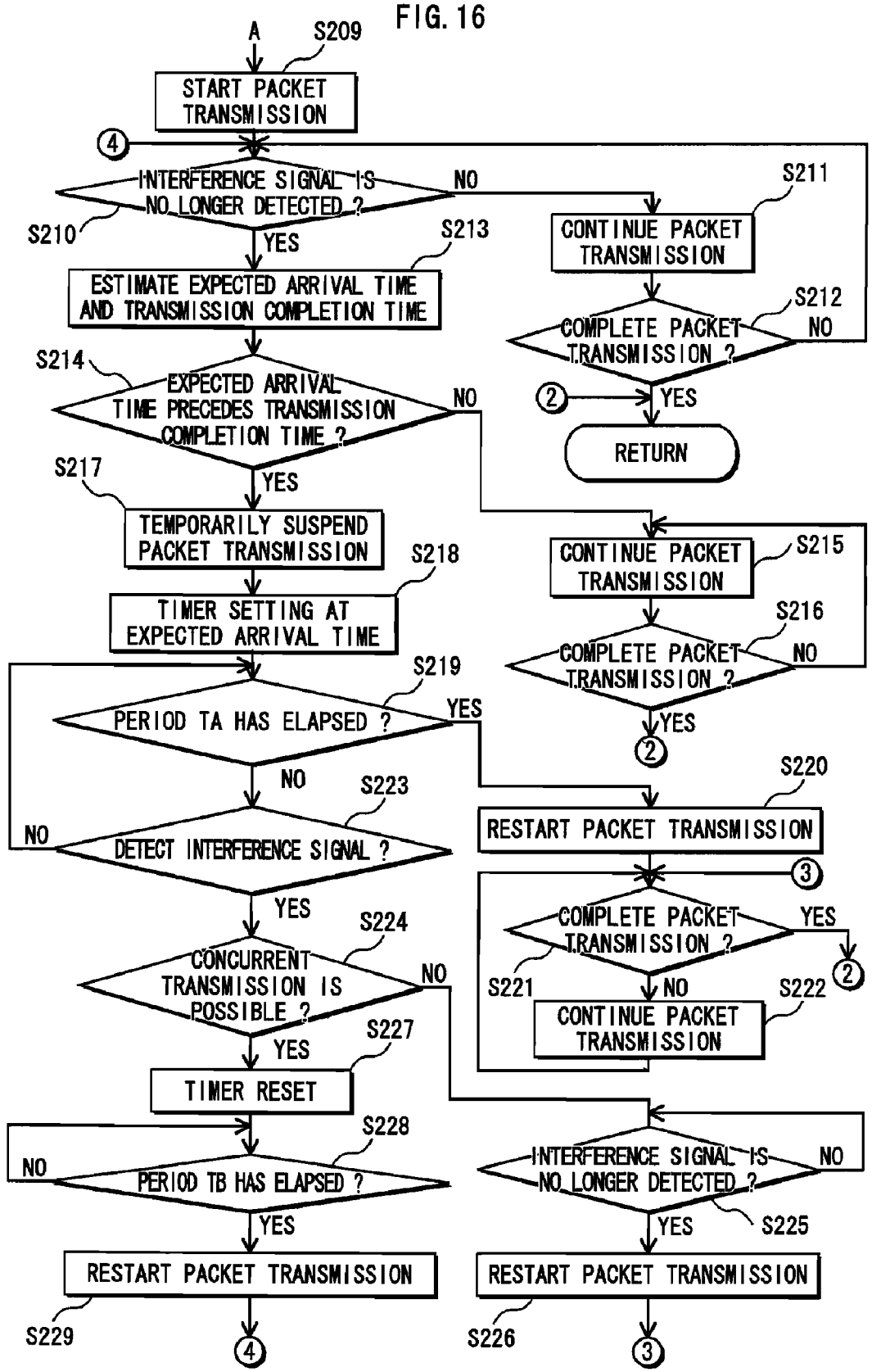
FIG. 16 is a flow chart showing a flow of the packet transmission processing according to the second embodiment.

FIG. 15 and FIG. 16 are flow charts showing a flow of packet transmission processing according to the second embodiment. Note that the flow charts shown in FIG. 15 and FIG. 16 are in series (i.e., the flow chart of FIG. 16 is a continuation of the flow chart of FIG. 15).

The wireless communication apparatus 11D performs processing of Steps S201 to S207 which is substantially the same as the processing of Steps S121 to S127.

Based on an elapsed time measured by the timer, the transmission timing control unit 111 judges whether the period TB has elapsed since an interference signal has been detected (Step S208). When the period TB has elapsed since the interference signal has been detected (Step S208: YES), processing of Step S209 and subsequent Steps is performed.

The transmission timing control unit 111 instructs the packet generation unit 101d to transmit a packet. The packet generation unit 101d starts outputting the packet to the modulation unit 102. Then, transmission of the packet from the antenna 104 is started (Step S209).

If the interference detection unit 108 continues to detect the interference signal (Step S210: NO), the packet generation unit 101d continues to output the packet to the modulation unit 102, and accordingly the packet continues to be transmitted from the antenna 104 (Step S211). If the transmission of the packet has not completed (Step S212: NO), processing of Step S210 and subsequent Steps is performed. When the transmission of the packet completes (Step S212: YES), the flow returns to the processing shown in FIG. 7.

If the interference detection unit 108 can no longer detect the interference signal (Step S210: YES), the transmission packet length control unit 151 estimates a time when a next interference signal is expected to arrive (an expected arrival time), and estimates a time when transmission of the packet completes in a case where the packet continues to be transmitted (a transmission completion time) (Step S213).

The transmission packet length control unit 151 compares the expected arrival time with the transmission completion time (Step S214). As a result of the comparison, if the expected arrival time follows the transmission completion time (Step S214: NO), the packet generation unit 101d continues to output the packet to the modulation unit 102, and accordingly the packet continues to be output from the antenna 104 (Step S215). The processing of Steps S215 and S216 is repeated until transmission of the packet has completed (Step S216: NO). When the transmission of the packet completes (Step S216: YES), the flow returns to the processing shown in FIG. 7.

As a result of the comparison performed in Step S214, if the expected arrival time precedes the transmission completion time (Step S214: YES), the transmission packet length control unit 151 determines to temporarily suspend transmission of the packet and divide the packet into subpackets, and instructs the packet generation unit 101d to divide the packet into subpackets. Upon receiving the instruction to divide the packet, the packet generation unit 101d divides the packet into subpackets and temporarily suspends output of the packet to the demodulation unit 102 (Step S217).

At the expected arrival time, the transmission timing control unit 111 sets the timer (Step S218). Note that the timer may be set in accordance with other timing.

Based on an elapsed time measured by the timer, the transmission timing control unit 111 judges whether the period TA has elapsed since the expected arrival time (Step S219).

When the period TA has elapsed since the expected arrival time (Step S219: YES), the transmission timing control unit 111 instructs the packet generation unit 101d to transmit the packet. The packet generation unit 101d restarts outputting the packet to the modulation unit 102, and accordingly output of the packet from the antenna 104 is restarted (Step 220). Until the transmission of the packet has completed (Step S221: NO), the packet continues to be transmitted (Step 222). When the transmission of the packet completes (Step S221: YES), the flow returns to the processing shown in FIG. 7.

If the interference detection unit 108 detects an interference signal (Step S223: YES) before the period TA has elapsed since the expected arrival time (Step S219: NO), the concurrent transmission judgment unit 110d judges whether it is possible to transmit the packet concurrently with the interference signal (Step S224).

If it is impossible to transmit the packet concurrently with the interference signal (Step S224: NO), when the interference detection unit 108 can no longer detect the interference signal (Step S225: YES), the transmission of the packet is restarted (Step S226), and then processing of Step S221 and subsequent Steps is performed.

If it is possible to transmit the packet concurrently with the interference signal (Step S224: YES), the concurrent transmission judgment unit 110d outputs, to the transmission timing control unit 111, a concurrent transmission signal indicating that the concurrent transmission is possible. Upon receiving the concurrent transmission signal indicating that the concurrent transmission is possible, the transmission timing control unit 111 resets the timer not shown in the figure (Step S227).

Based on an elapsed time measured by the timer, the transmission timing control unit 111 judges whether the period TB has elapsed since the interference signal has been detected (Step S228).

When the period TB has elapsed since the interference signal has been detected (Step S228: YES), the transmission of the packet is restarted (Step S229). Then, the flow returns to Step S210.

Modification of Second Embodiment

The following describes a modification of the second embodiment with reference to the drawings.

In the modification of the second embodiment, it is judged whether a received signal is an interference signal, with use of a destination address in a header of the received signal that has been decoded as a result of decoding of the received signal. Also, if it is judged that the received signal is an interference signal, a period for which the interference signal continues to arrive at the transmitter is estimated with use of a length of a packet included in the header, and a length of a packet to be transmitted at a time is controlled.

<Structure of Wireless Communication Apparatus>

Figure 17:
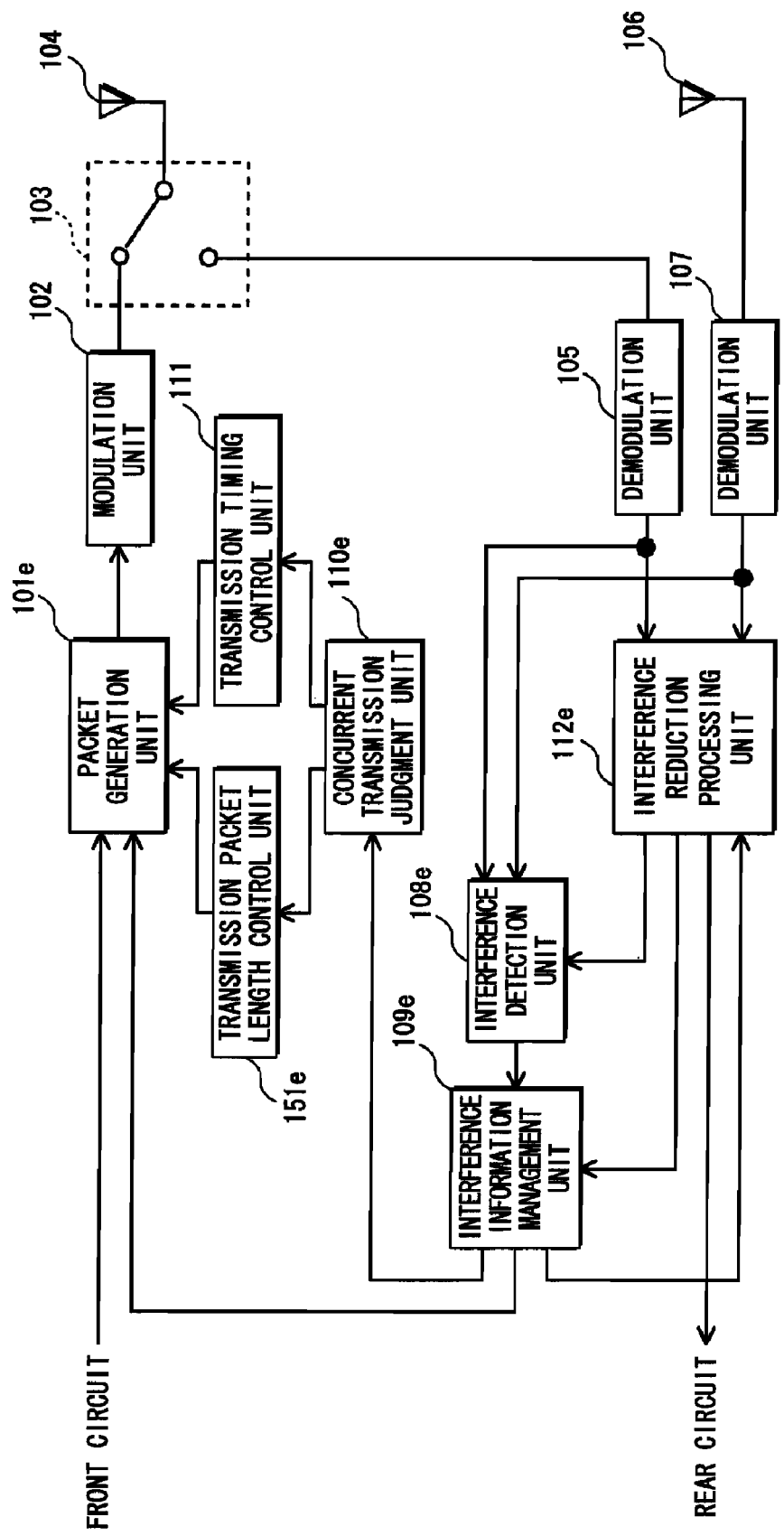
FIG. 17 shows the apparatus structure of a wireless communication apparatus according to a modification of the second embodiment.

FIG. 17 shows the apparatus structure of a wireless communication apparatus according to the modification of the second embodiment. Note that compositional elements according to this modification having substantially the same functions as the compositional elements according to the above embodiments and modifications have the same reference letters of those according to the above embodiments and modifications. The explanation of the above embodiments and modifications is applicable to this modification. Accordingly, the explanation of the compositional elements according to this modification is omitted here.

The wireless communication apparatus includes a packet generation unit 101e, a modulation unit 102, a switch circuit 103, antennas 104 and 106, demodulation units 105 and 107, an interference detection unit 108e, an interference information management unit 109e, a concurrent transmission judgment unit 110e, a transmission timing control unit 111, a transmission packet length control unit 151e, and an interference suppression processing unit 112e.

In addition to performing the processing of the packet generation unit 101, based on a length of a packet to be transmitted at a time which is input by the transmission packet length control unit 151, the packet generation unit 101e outputs the packet to the modulation unit 102.

In addition to performing the processing of the interference suppression processing unit 112, the interference suppression processing unit 112e outputs a destination address and a length of a packet included in a header of decoded data on a channel that is the same as a channel through which the wireless communication apparatus transmits a packet to the interference detection unit 108e.

Based on the destination address input by the interference suppression processing unit 112e, the interference detection unit 108e judges whether a received signal is a desired signal or an interference signal. If the destination address input by the interference suppression processing unit 112e is not an address of the wireless communication apparatus, the interference detection unit 108e judges that the received signal is an interference signal. Then, the interference detection unit 108e outputs, to the interference information management unit 109e, channel information of the interference signal, a power level at which the interference signal is received, and a length of packet included in a header thereof. If the destination address input by the interference suppression processing unit 112e is the address of the wireless communication apparatus, the interference detection unit 108e judges that the received signal is a desired signal.

The interference information management unit 109e stores therein the channel information of the interference signal, the power level thereof, and the packet length thereof that have been input by the interference detection unit 108e. The interference information management unit 109e outputs, to the concurrent transmission judgment unit 110e, the channel information of the interference signal, the power level thereof, and the packet length thereof that have been detected by the wireless communication apparatus. Note that the data stored in and output by the interference information management unit 109e is substantially the same as the data stored in and output by the interference information management unit 109.

In addition to performing the processing of the concurrent transmission judgment unit 110, the concurrent transmission judgment unit 110e outputs, to the transmission packet length control unit 151e, the packet length of the interference signal input by the interference information management unit 109e.

Based on the packet length of the interference signal input by the concurrent transmission judgment unit 110e, the transmission packet length control unit 151e estimates a time at which the interference signal no longer arrives. The transmission packet length control unit 151e adds an arrival interval of interference signals to the estimated time to estimate a time at which a next interference signal arrives (an expected arrival time).

In a communication protocol in which an ACK packet is returned in response to a data packet, for example, it is possible to determine an arrival interval of interference signals as a period necessary for returning the ACK packet in response to the data packet. Alternatively, it is possible to store a history of arrival intervals of interference signals, and determine the arrival interval based on the history.

The transmission packet length control unit 151e estimates a time at which transmission of the packet has completed in a case where the packet including all parts that have not been yet transmitted is transmitted (a transmission completion time).

The transmission packet length control unit 151e compares the expected arrival time with the transmission completion time. If the expected arrival time precedes the transmission completion time, the transmission packet length control unit 151e calculates a length of a packet that can be transmitted until the interference signal being detected no longer arrives, based on a length of a packet included in the interference signal being detected. The transmission packet length control unit 151e outputs the calculated length to the packet generation unit 101e, as a length of a packet to be transmitted at a time.

If the expected arrival time follows the transmission completion time, the transmission packet length control unit 151e outputs, to the packet generation unit 101e, a length of the packet including all parts that have not been yet transmitted, as a length of a packet to be transmitted at a time.

Third Embodiment

The following describes a third embodiment with reference to the drawings. The third embodiment is intended for a wireless communication apparatus that performs MIMO (Multiple Input Multiple Output) transmission/reception.

<Outline of Wireless Communication System>

Figure 18:
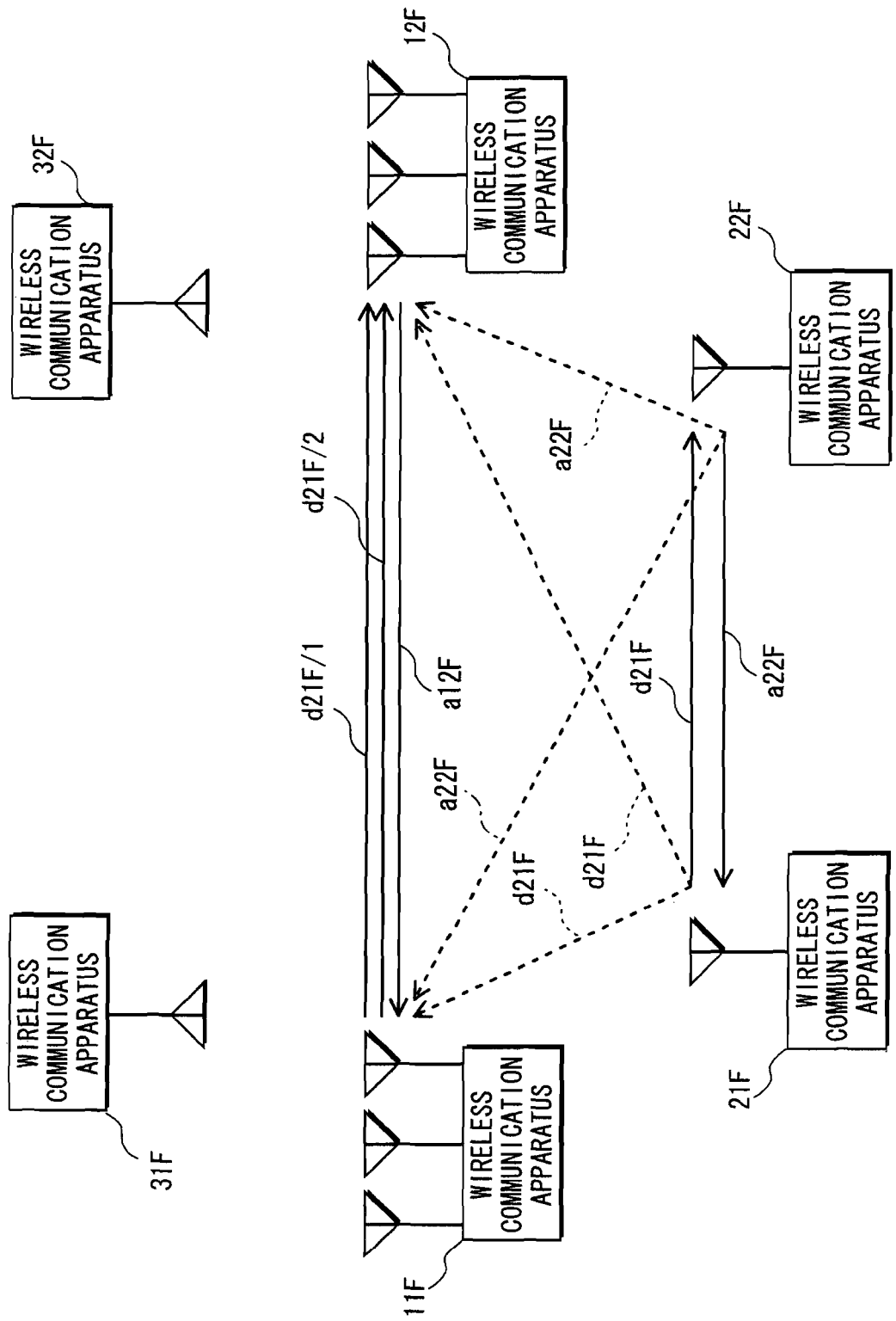
FIG. 18 shows the structure of a wireless communication system according to a third embodiment.

FIG. 18 shows the structure of a wireless communication system according to the third embodiment. Note that each of wireless communication apparatuses 11F and 12F operates as the wireless communication apparatus of the present invention, and also operates as a receiver having a function of suppressing an interference signal included in a received signal by receiving the interference signal in advance for a predetermined period. Wireless communication apparatuses 21F, 22F, 31F, and 32F are interference sources of the wireless communication apparatuses 11F and 12F.

In FIG. 18, the wireless communication apparatuses 11F and 12F perform communications with each other. Also, the wireless communication apparatuses 21F and 22F perform communications with each other. Furthermore, the wireless communication apparatuses 31F and 32F perform communications with each other. In FIG. 18, solid lines represent desired signals, and dotted lines represent interference signals.

Figure 22:
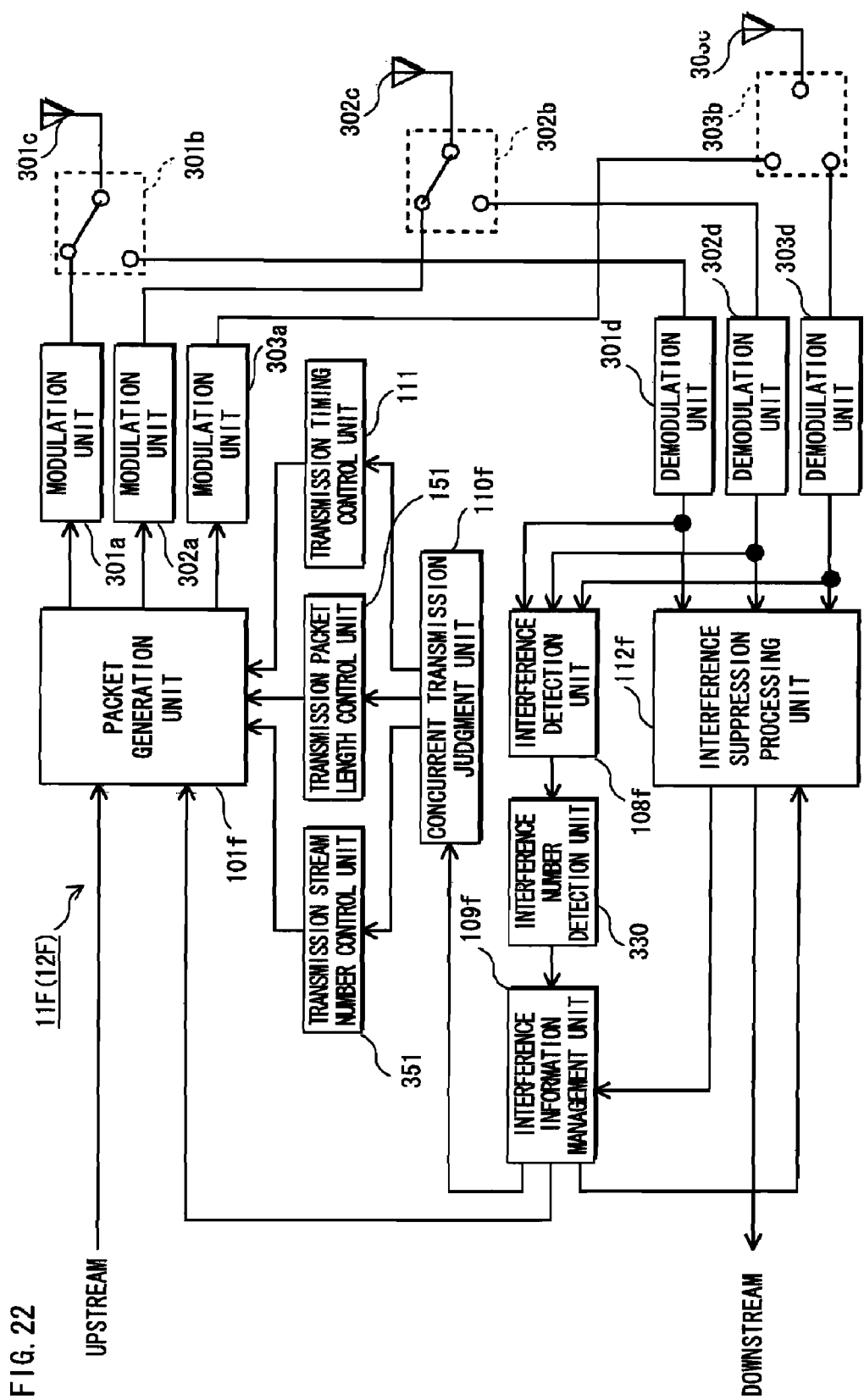
FIG. 22 shows the apparatus structure of a wireless communication apparatus according to the third embodiment.

Each of the wireless communication apparatuses 11F and 12F includes N modulation units (N is a positive integer, and is three in the example shown in FIG. 22) and M plural demodulation units (M is a positive integer and is 3 in the example shown in FIG. 22), and performs MIMO transmission/reception. In the MIMO transmission/reception, separate pieces of data (hereinafter referred to as "streams") are transmitted between transmitters and receivers by being superimposed on the same frequency channel through a plurality of transmission channels by space division. The wireless communication apparatuses 11F and 12F are capable of performing data transmission by using up to N streams, and determine the number of streams to be used in accordance with the number of interference signals.

In the third embodiment, the wireless communication apparatuses 11F and 12F are capable of performing data transmission by using up to three streams, and capable of suppressing up to two interference signals included in a received signal.

Here, before describing the apparatus structure and processing flow of the wireless communication apparatuses 11F and 12F, a specific example of a transmission sequence of the wireless communication system according to the third embodiment is described.

<Transmission Sequence Example (1)>

Figure 19:
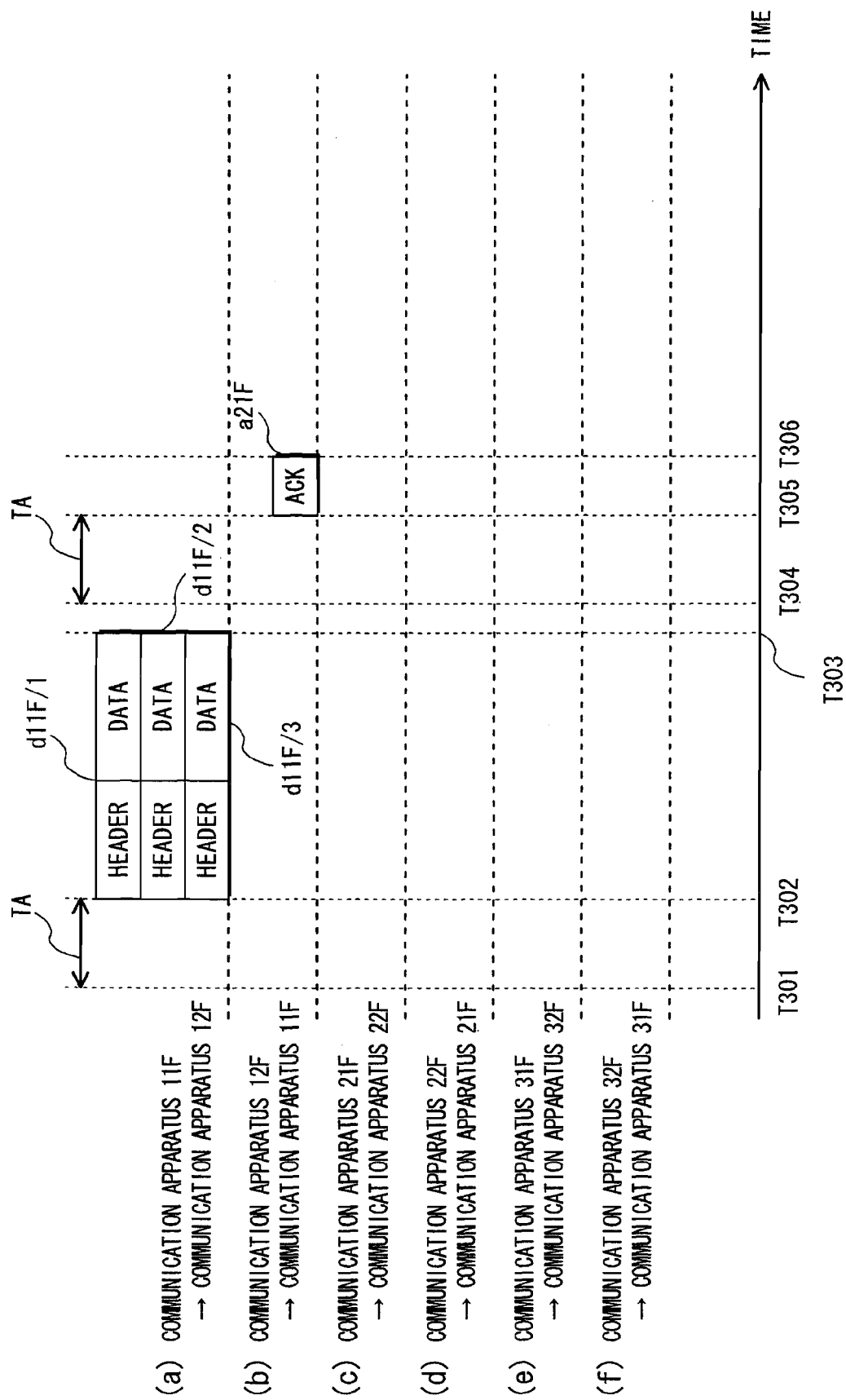
FIG. 19 shows an example of a transmission sequence of the wireless communication system shown in FIG. 18.

FIG. 19 shows an example of a transmission sequence of the wireless communication system shown in FIG. 18. Note that, in the transmission sequence shown in FIG. 19, until the period TA has elapsed since the wireless communication apparatus 11F has determined to transmit a data packet, and until the period TA has elapsed since the wireless communication apparatus 12F has determined to transmit an ACK packet, other wireless communication apparatuses included in the wireless communication system do not perform packet transmission.

At a time T301, the wireless communication apparatus 11F determines to transmit a data packet, and does not immediately transmit the data packet, and then performs interference signal detection for the period TA.

For the period TA from the time T301 to a time T302, the wireless communication apparatus 11F does not detect an interference signal. At the time T302 at which the period TA has elapsed since the time T301, the wireless communication apparatus 11F determines the number of streams to be used as "3" which is the number of streams that the wireless communication apparatus 11F can perform data transmission (the maximum number of transmittable streams). This is because the wireless communication apparatus 11F does not detect an interference signal. Then, the wireless communication apparatus 11F starts transmitting data packets d11F/1, d11F/2, and d11F/3 to the wireless communication apparatus 12F. At a time T303, the wireless communication apparatus 11F completes the transmission of the data packets dl1F/1, d11F/2, and d11F/3.

In the third embodiment, the number of streams to be used is determined as a value that is a result of subtraction of the number of interference signals from the maximum number of transmittable streams. This method for determining the number of streams to be used is appropriate for when high-speed performance is required for data transmission. Also, when reliability is required for data transmission, it is preferable to determine the number of streams to be used as a value that is less than a result of subtraction of the number of interference signals from the maximum number of transmittable streams.

At a time T304, the wireless communication apparatus 12F determines to transmit an ACK packet as a response to the data packets d11F/1, d11F/2, and d11F/3, and then perform interference signal detection for the period TA. Note that the wireless communication apparatus 12F can separate streams to decode the separated streams by estimating an inverse matrix of a transmission channel matrix between transmission/reception antennas to equalize the estimated inverse matrix. Also, by the wireless communication apparatus 12F receiving streams using antennas whose number is greater than the number of streams, the reliability of data transmission is improved owing to the diversity gain.

For the period TA from the time T304 to a time T305, the wireless communication apparatus 11F does not detect an interference signal. At the time T305 at which the period TA has elapsed since the time T304, the wireless communication apparatus 12F starts transmitting an ACK packet a12F to the wireless communication apparatus 11F. At a time T306, the wireless communication apparatus 12F completes the transmission of the ACK packet a12F.

<Transmission Sequence Example (2)>

Figure 20:
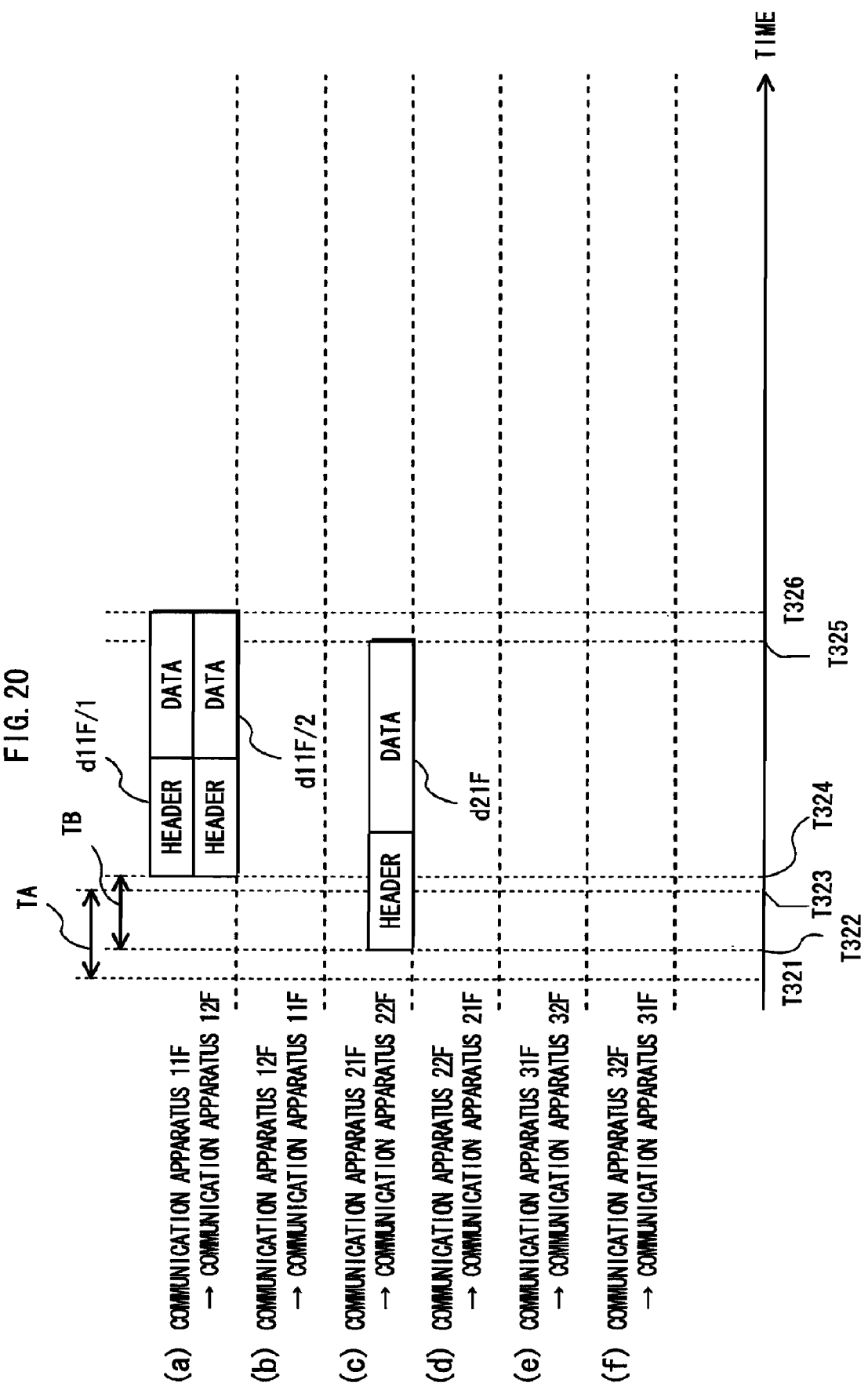
FIG. 20 shows another example of the transmission sequence of the wireless communication system shown in FIG. 18.

FIG. 20 shows another example of the transmission sequence of the wireless communication system shown in FIG. 18. Note that, in the transmission sequence shown in FIG. 20, the wireless communication apparatus 21F transmits a data packet before the period TA has elapsed since the wireless communication apparatus 11F has determined to transmit a data packet.

At a time T321, the wireless communication apparatus 11F determines to transmit a data packet, and then performs interference signal detection for the period TA.

At a time T322 included in the period TA for which the wireless communication apparatus 11F performs interference signal detection, the wireless communication apparatus 21F starts transmitting a data packet d21F to the wireless communication apparatus 22F. At a time T325, the wireless communication apparatus 21F completes the transmission of the data packet d21F.

At the time T322 preceding a time T323 at which the period TA has elapsed since the time T321, the wireless communication apparatus 11F detects the data packet d21F (an interference signal). The wireless communication apparatus 11F judges whether it is possible to transmit a data packet concurrently with the interference signal. In this transmission sequence, the wireless communication apparatus 11F judges that it is possible to transmit the data packet concurrently with the interference signal.

The wireless communication apparatus 11F does not detect a new interference signal for the period TB. At a time T324 at which the period TB has elapsed since the time T322 at which the wireless communication apparatus 11F has detected the interference signal, the wireless communication apparatus 11F determines the number of streams to be used as "2" which is less by one than the maximum number of transmittable streams "3". This is because the wireless communication apparatus 11F has detected one interference signal. Then, at a time T324, the wireless communication apparatus 11F starts transmitting the data packets d11F/1 and d11F/2. At a time T326, the wireless communication apparatus 11F completes the transmission of the data packets d11F/1 and d11F/2.

<Transmission Sequence Example (3)>

Figure 21:
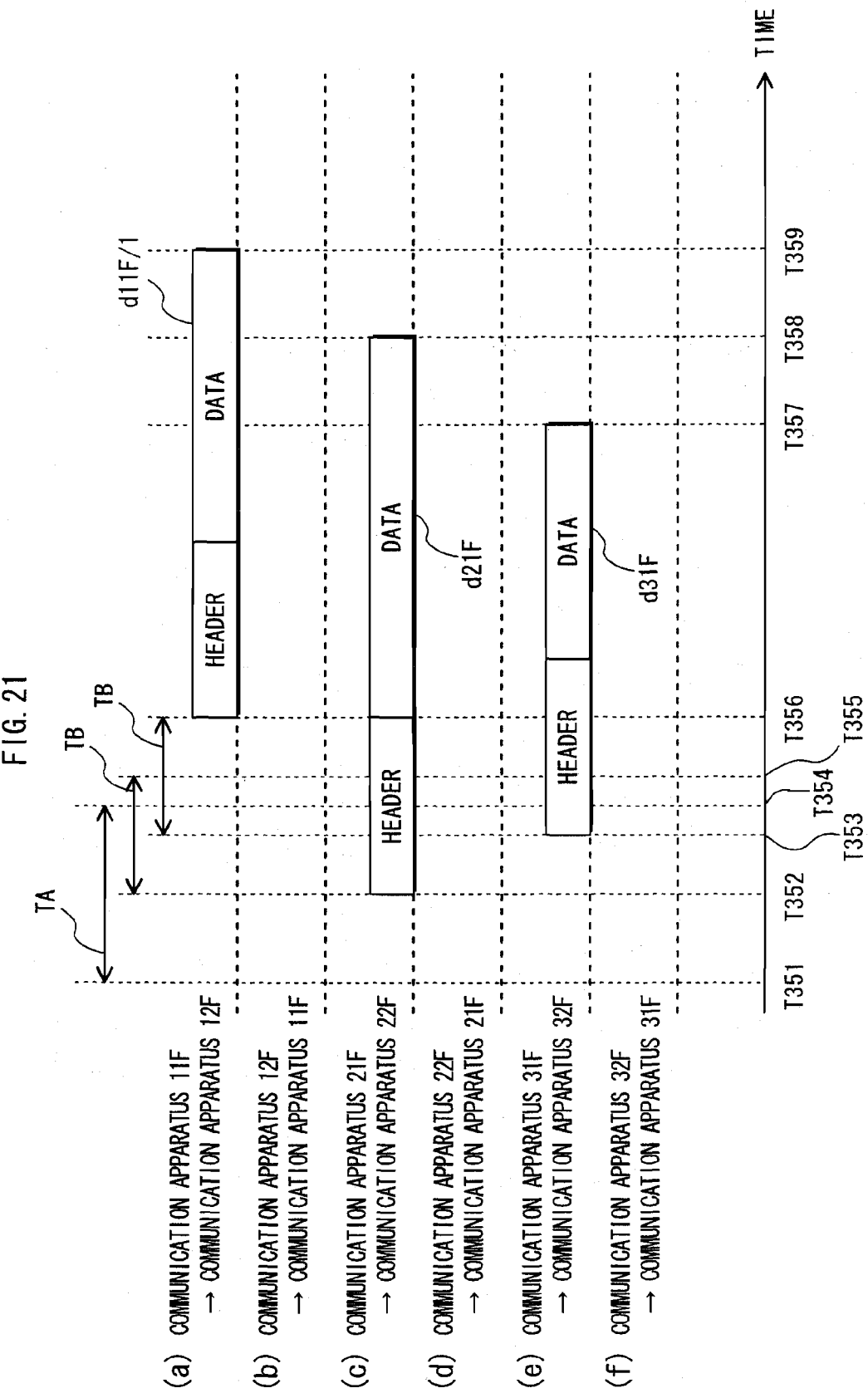
FIG. 21 shows yet another example of the transmission sequence of the wireless communication system shown in FIG. 18.

FIG. 21 shows yet another example of the transmission sequence of the wireless communication system shown in FIG. 18. Note that, in the transmission sequence shown in FIG. 21, a new interference signal is detected before elapse of the period TB since an interference signal has been detected.

At a time T351, the wireless communication apparatus 11F determines to transmit a data packet, and then performs interference signal detection.

At a time T352 included in the period TA for which the wireless communication apparatus 11F performs interference signal detection, the wireless communication apparatus 21F starts transmitting a data packet d21F to the wireless communication apparatus 22F. At a time T358, the wireless communication apparatus 11F completes the transmission of the data packet d21F.

At the time T352 preceding a time T354 at which the period TA has elapsed since the time T351, the wireless communication apparatus 11F detects the data packet d21F (an interference signal). The wireless communication apparatus 11F judges whether it is possible to transmit a data packet concurrently with the interference signal. In this transmission sequence, the wireless communication apparatus 11F judges that it is possible to transmit the data packet concurrently with the interference signal.

Until the period TB has elapsed since the time T352 at which the interference signal has been detected, the wireless communication apparatus 11F waits to transmit the data packet and further performs interference signal detection.

At a time T353 included in the period for which the wireless communication apparatus 11F waits to transmit the data packet, the wireless communication apparatus 31F starts transmitting a data packet d31F to the wireless communication apparatus 32F. At a time T357, the wireless communication apparatus 31F completes the transmission of the data packet d31F.

At the time T353 preceding a time T355 at which the period TB has elapsed since the time T352, the wireless communication apparatus 11F detects the data packet d31F (an interference signal). The wireless communication apparatus 11F judges whether it is possible to transmit the data packet concurrently with the interference signal. In this transmission sequence, the wireless communication apparatus 11F judges that it is possible to transmit the data packet concurrently with the interference signal.

Until the period TB has elapsed since the time T353 at which the interference signal has been detected, the wireless communication apparatus 11F waits to transmit the data packet and further performs interference signal detection.

The wireless communication apparatus 11F does not detect a new interference signal for the period TB. At a time T356 at which the period TB has elapsed since the time T353, the wireless communication apparatus 11F determines the number of streams to be used as "1" which is less by two than the maximum number of transmittable streams "3". This is because the wireless communication apparatus 11F has detected two interference signals. Then, at the time T356, the wireless communication apparatus 11F starts transmitting the data packet d11F/1. At a time T359, the wireless communication apparatus 11F completes the transmission of the data packet d11F/1.

<Structure of Wireless Communication Apparatus>

FIG. 22 shows the structure of the wireless communication apparatus 11F according to the third embodiment. Note that the wireless communication apparatus 12F has the same structure as the wireless communication apparatus 11F. Compositional elements according to the third embodiment having substantially the same functions as the compositional elements according to the first and second embodiments and the modifications thereof have the same reference letters of those according to these embodiments and modifications. The explanation of the embodiments and modifications is applicable to the third embodiment. Accordingly, the explanation of the compositional elements according to the third embodiment is omitted here.

The wireless communication apparatus 11F includes a packet generation unit 101f, modulation units 301a, 302a, and 303a, switch circuits 301b, 302b, and 303b, antennas 301c, 302c, and 303c, demodulation units 301d, 302d, and 303d, an interference detection unit 108f, an interference number detection unit 330, an interference information management unit 109f, a concurrent transmission judgment unit 110f, a transmission timing control unit 111, a transmission packet length control unit 151, a transmission stream number control unit 351, and an interference suppression processing unit 112f.

The packet generation unit 101f is controlled by the transmission timing control unit 111, regarding a transmission timing of a packet to be transmitted. The packet generation unit 101f is controlled by the transmission packet length control unit 151, regarding a length of a packet to be transmitted at a time. The packet generation unit 101f is controlled by the transmission stream control unit 351, regarding the number of streams to be used.

The modulation units 301a, 302a, and 303a respectively modulate packets input by the packet generation unit 101f to a radio frequency band. The packets modulated to the radio frequency band by the modulation units 301a, 302a, and 303a are respectively output from the antennas 301c, 302c, and 303c via the switch circuits 301b, 302b, and 303b.

The switch circuit 301b connects the antenna 301c to either one of an output end of the modulation unit 301a and an input end of the demodulation unit 301d. The switch circuit 302b connects the antenna 302c to either one of an output end of the modulation unit 302a and an input end of the demodulation unit 302d. The switch circuit 303b connects the antenna 303c to either one of an output end of the modulation unit 303a and an input end of the demodulation unit 303d.

The demodulation units 301d, 302d, and 303d respectively demodulate received signals to the radio frequency band, which have been received by the antennas 301c, 302c and 303c and have been input via the switch circuits 301b, 302b, and 303b, to a baseband frequency band. The demodulation units 301d, 302d, and 303d respectively output the demodulated received signals to the interference detection unit 108f and the interference suppression processing unit 112f.

When a packet is received or when an interference signal is detected, the switch circuits 301b, 302b, and 303b respectively connect the antennas 301c, 302c and 303c to the input ends of the demodulation units 301d, 302d, and 303d.

In order to continue to detect an interference signal upon packet transmission (in order to enable the transmission packet length control unit 151 to control a length of a packet to be transmitted at a time), depending on the number of detected interference signals, the switch circuits 301b, 302b, and 303b respectively connect certain parts of the antennas 301c, 302c, and 303c to the input ends of the demodulation units 301d, 302d, and 303d, and connect other remaining parts of the antennas 301c, 302c, and 303c to the output ends of the demodulation units 301d, 302d, and 303d. When no interference signal has been detected, for example, the switch circuits 301b, 302b, and 303b respectively connect the antennas 301c, 302c, and 303c to the output ends of the modulation units 301a, 302a, and 303a.

The interference detection unit 108f performs interference signal detection based on the input by the demodulation units 301d, 302d, and 303d, and then outputs a result of the detection to the interference number detection unit 330.

In the third embodiment, the interference detection unit 108f performs interference signal detection on an adjacent channel based on input by the demodulation units 301d, 302d, and 303d, and outputs, to the interference number detection unit 330, information indicating the adjacent channel on which each of the interference signals has been detected and a power level at which the interference signal is received.

The interference number detection unit 330 detects the number of the detected interference signals (hereinafter referred to as the "interference signal number") based on the input by the interference detection unit 108f. The interference number detection unit 330 outputs the channel information of the detected interference signal and the power level thereof input by the interference detection unit 108f to the interference information management unit 109f, and outputs the interference signal number to the interference information management unit 109f.

The interference information management unit 109f stores therein the channel information of the interference signal and the power level thereof detected by the interference detection unit 108f, and further stores therein the interference signal number detected by the interference number detection unit 330. The interference information management unit 109f outputs the interference signal number to the concurrent transmission judgment unit 110f. Note that the data stored in and output by the interference information management unit 109f is substantially the same as the data stored in and output by the interference information management unit 109d, excepting the above description.

In addition to performing the concurrent transmission judgment processing of the concurrent transmission judgment unit 110, the concurrent transmission judgment unit 110f performs the following processing.

The concurrent transmission judgment unit 110f compares the number of detected interference signals (the interference signal number) with the number of interference signals that can be suppressed by a wireless communication apparatus on the receiving side (hereinafter referred to as the "suppressible interference signal number"). If the interference signal number is no more than the suppressible interference signal number, the concurrent transmission judgment unit 110f judges that it is possible to transmit the packet concurrently with the interference signal. Note that, for example, the wireless communication apparatus may acquire a suppressible interference signal number of a wireless communication apparatus as a communication party by exchanging its own suppressible interference signal number with a suppressible interference signal number of the wireless communication apparatus as the communication party upon establishment of the communication link or the like. Alternatively, the wireless communication apparatus may acquire a suppressible interference signal number of a wireless communication apparatus as a communication party by including a suppressible interference signal number of the wireless communication apparatus in interference information included in a header of a data packet or an ACK packet.

Based on the maximum number of transmittable streams of the wireless communication apparatus and the number of interference signals detected by the interference detection unit 108f (the interference signal number), the transmission stream number control unit 351 determines the number of streams to be used. Then, based on a result of the determination, the transmission stream number control unit 351 controls the number of streams to be used by the packet generation unit 101*f*. In the third embodiment, the transmission stream number control unit 351 determines the number of streams to be used as a value of a result of subtraction of the interference signal number form the maximum number of transmittable streams. The packet generation unit 101*f* divides transmission data into pieces whose number is the determined number of the streams to be used, and packetizes the divided pieces of the data, and then outputs the packetized pieces to a rear circuit.

Note that the flow of the packet transmission/reception processing according to the third embodiment is substantially the same as the flow shown in FIG. 7. Accordingly, the following describes the flow of the packet transmission processing (of data packets) and the packet transmission processing (of ACK packets) shown in FIG. 7.

<Flow of Packet Transmission Processing>

Figure 23:
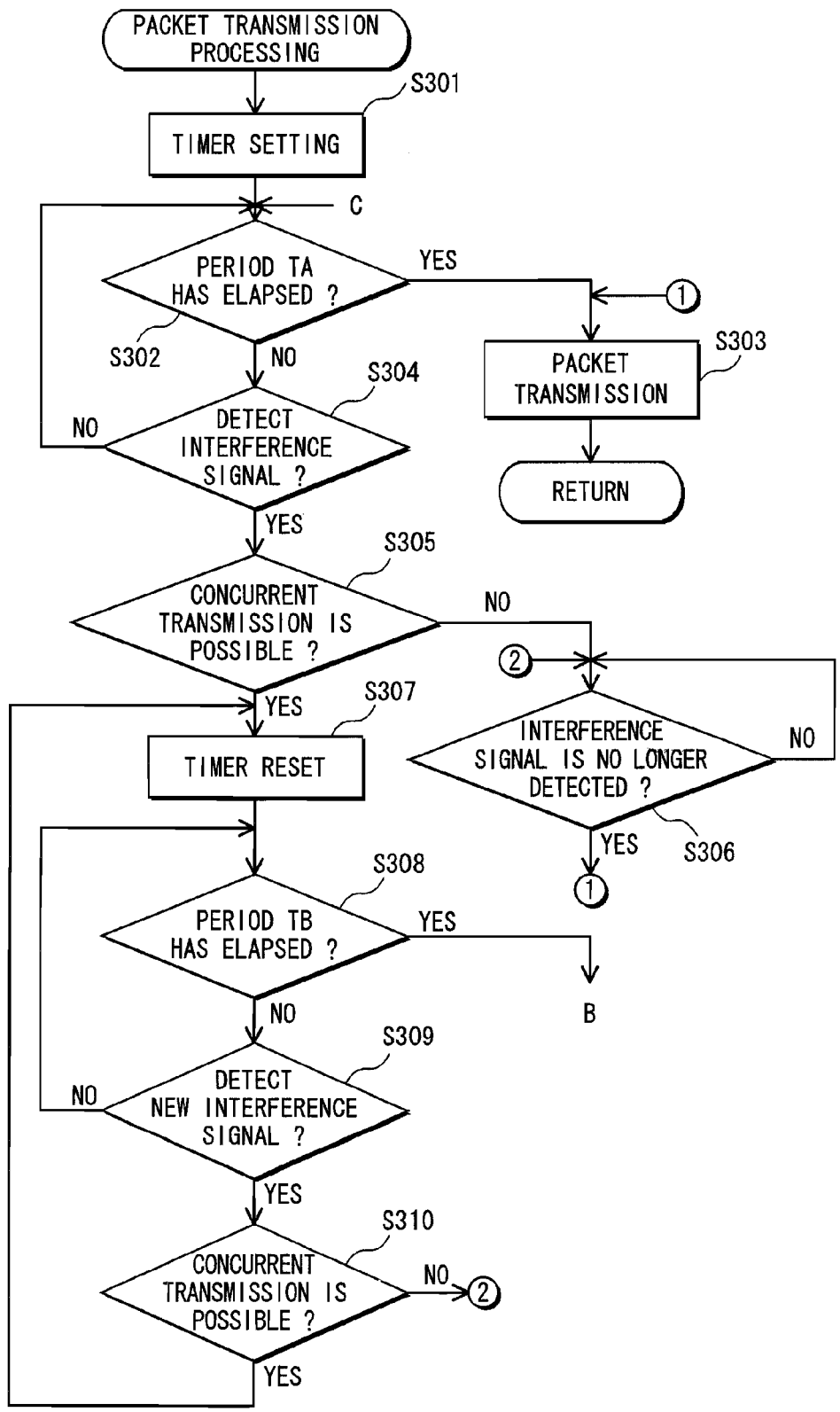
FIG. 23 is a flow chart showing a flow of packet transmission processing according to the third embodiment.
Figure 24:
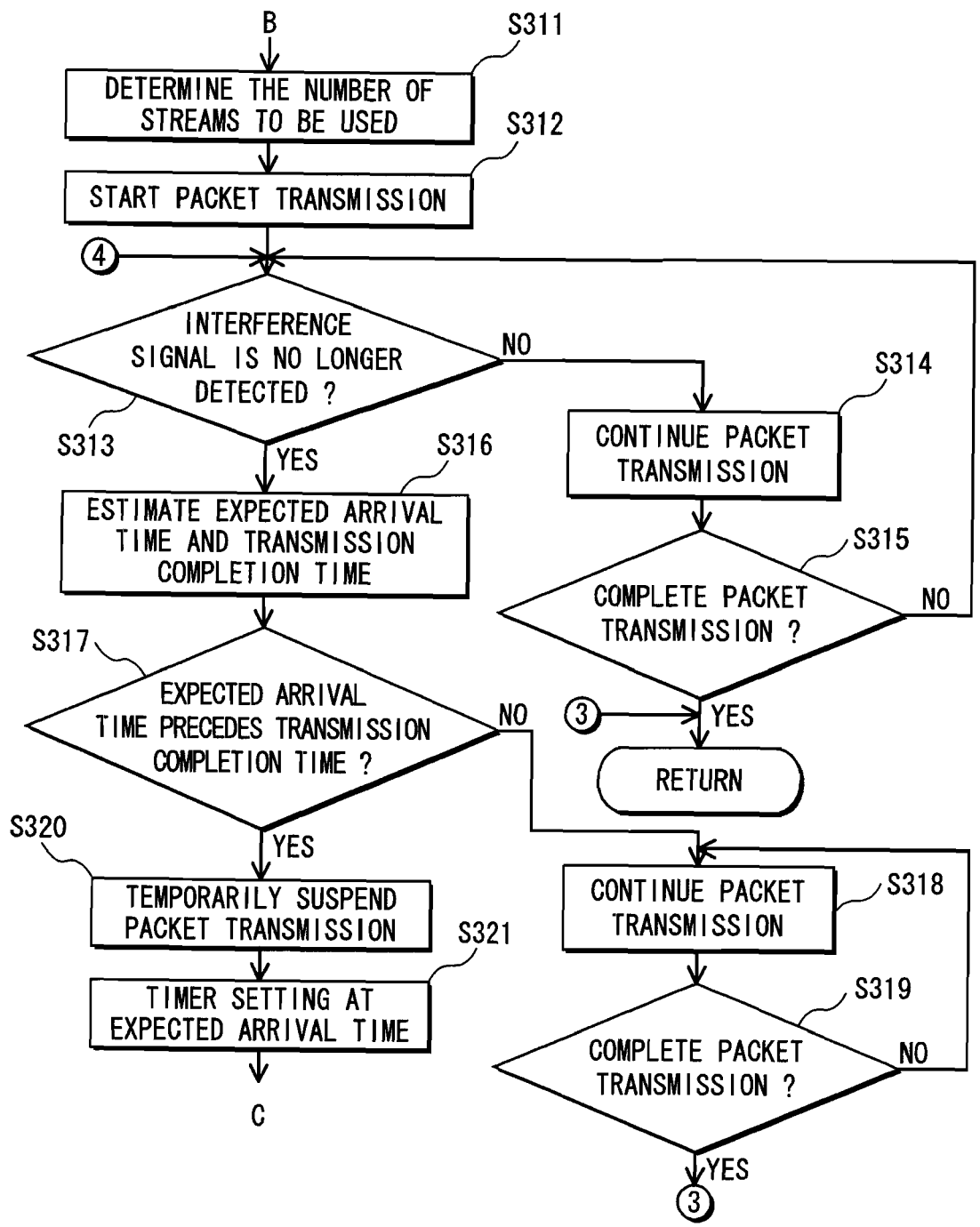
FIG. 24 is a flow chart showing a flow of the packet transmission processing according to the third embodiment.

FIGS. 23 and 24 are flow charts showing a flow of packet transmission processing according to the third embodiment. Note that the flow charts shown in FIGS. 23 and 24 are one (continuous) series of processing flows.

The wireless communication apparatus 11F performs processing of Steps S301 to S307 which is substantially the same as the processing of Steps S121 to S127. In the judgment on whether concurrent transmission of a data packet and an interference signal is possible, the concurrent transmission judgment unit 110*f* performs the above two types of judgment processing.

Based on an elapsed time measured by the timer, the transmission timing control unit 111 judges whether the period TB has elapsed since an interference signal has been detected (Step S308). When the period TB has elapsed since the interference signal has been detected (Step S308: YES), processing of Step S311 and the subsequent Steps are performed.

If the interference detection unit 108*f* detects a new interference signal (Step S309: YES) before the period TB has elapsed since the interference signal has been detected (Step S308: NO), the concurrent transmission judgment unit 110*f* judges whether it is possible to transmit the packet concurrently with the new interference signal (Step S310).

If it is impossible to transmit a packet concurrently with the new interference signal (Step S310: NO), when the interference detection unit 108*f* can no longer detect the new interference signal (Step S306: YES), processing of Step S303 is performed so as to output the packet from the antenna 301*a* and the like.

If it is possible to transmit the packet concurrently with the new interference signal (Step S310: YES), the concurrent transmission judgment unit 110*f* outputs a concurrent transmission signal indicating that the concurrent transmission is possible to the transmission timing control unit 111. Upon receiving the concurrent transmission signal indicating that the concurrent transmission is possible, the transmission timing control unit 111 resets a timer not shown in the figure (Step S307). Then, the flow proceeds to Step S308.

The transmission stream number control unit 351 determines the number of streams to be used (Step S311). The packet generation unit 101*f* starts transmitting the packet (Step S312).

If the interference detection unit 108*f* continues to detect the interference signal (Step S313: NO), the packet generation unit 101*f* continues to output the packet to the modulation unit 301*a* and the like, and accordingly the packet continues to be transmitted from the antenna 301*a* and the like (Step S314). If the transmission of the packet has not completed (Step S315: NO), the processing of Step S313 and the subsequent Steps are continuously performed. When the transmission of the packet completes (Step S315: YES), the flow returns to the processing shown in FIG. 7.

If the interference detection unit 108*f* can no longer detect the interference signal (Step S313: YES), the transmission packet length control unit 151 estimates a time when an interference signal is expected to arrive next (an expected arrival time), and estimates a time when the wireless communication apparatus 11D completes transmission of a packet in a case where the wireless communication apparatus 11D continues to transmit the packet (a transmission completion time) (Step S316).

The transmission packet length control unit 151 compares the expected arrival time with the transmission completion time (Step S317). As a result of the comparison, if the expected arrival time follows the transmission completion time (Step S317: NO), the packet generation unit 101*f* continues to output the packet to the modulation unit 301*a* and the like, and accordingly the packet continues to be transmitted from the antenna 301*a* and the like (Step S318). Until the transmission of the packet has completed (Step S319: NO), the processing of Steps S318 and S319 is repeated. When the transmission of the packet completes (Step S319: YES), the flow returns to the processing shown in FIG. 7.

As a result of the comparison performed in Step S317, if the expected arrival time precedes the transmission completion time (Step S317: YES), the transmission packet length control unit 151 determines to temporarily suspend transmission of the packet and divide the packet, and instructs the packet generation unit 101*f* to divide the packet. Upon receiving the instruction to divide the packet, the packet generation unit 101*f* temporarily suspends output of the packet to the demodulation unit 102, and divides the packet (Step S320).

At the expected arrival time, the transmission timing control unit 111 sets the timer (Step S321), the processing of Step S302 and the subsequent Steps are performed. Note that the timer may be set in accordance with other timing.

Modification of Third Embodiment

The following describes a modification of the third embodiment with reference to the drawings.

In this modification, as well as wireless communication apparatuses having a function of suppressing an interference signal included in a received signal, wireless communication apparatuses that are interference sources perform MIMO transmission/reception.

<Outline of Wireless Communication System>

Figure 25:
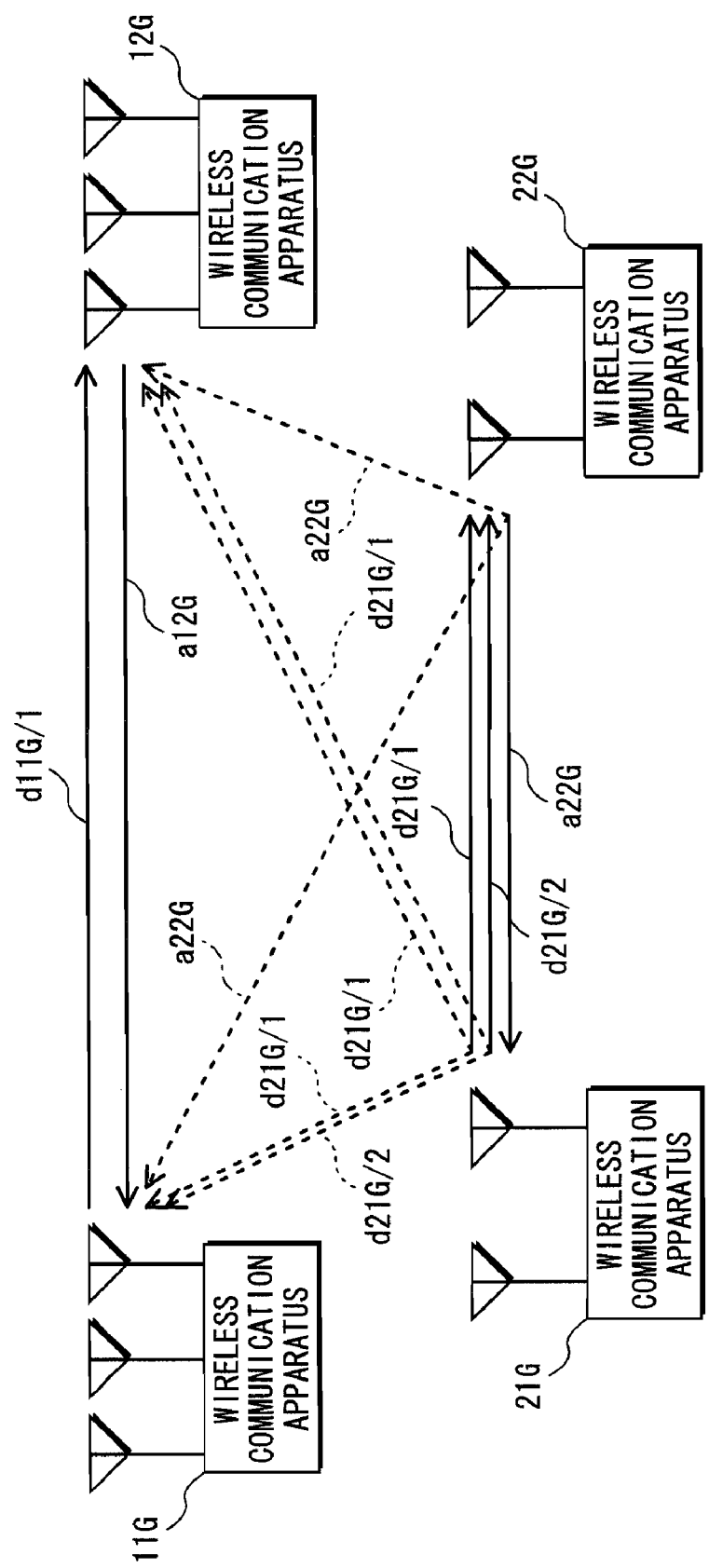
FIG. 25 shows the structure of a wireless communication system according to a modification of the third embodiment.

FIG. 25 shows the structure of a wireless communication system according to the modification of the third embodiment.

In FIG. 25, the wireless communication apparatuses 11G and 12G perform communications with each other. Also, wireless communication apparatuses 21G and 22G perform communications with each other.

Note that each of the wireless communication apparatuses 11G and 12G operates as the wireless communication apparatus of the present invention, and also operates as a receiver having a function of suppressing an interference signal included in a received signal by receiving the interference signal in advance for a predetermined period. The wireless communication apparatuses 21G and 22G are interference sources of the wireless communication apparatuses 11G and 12G.

<Example of Transmission Sequence>

Figure 26:
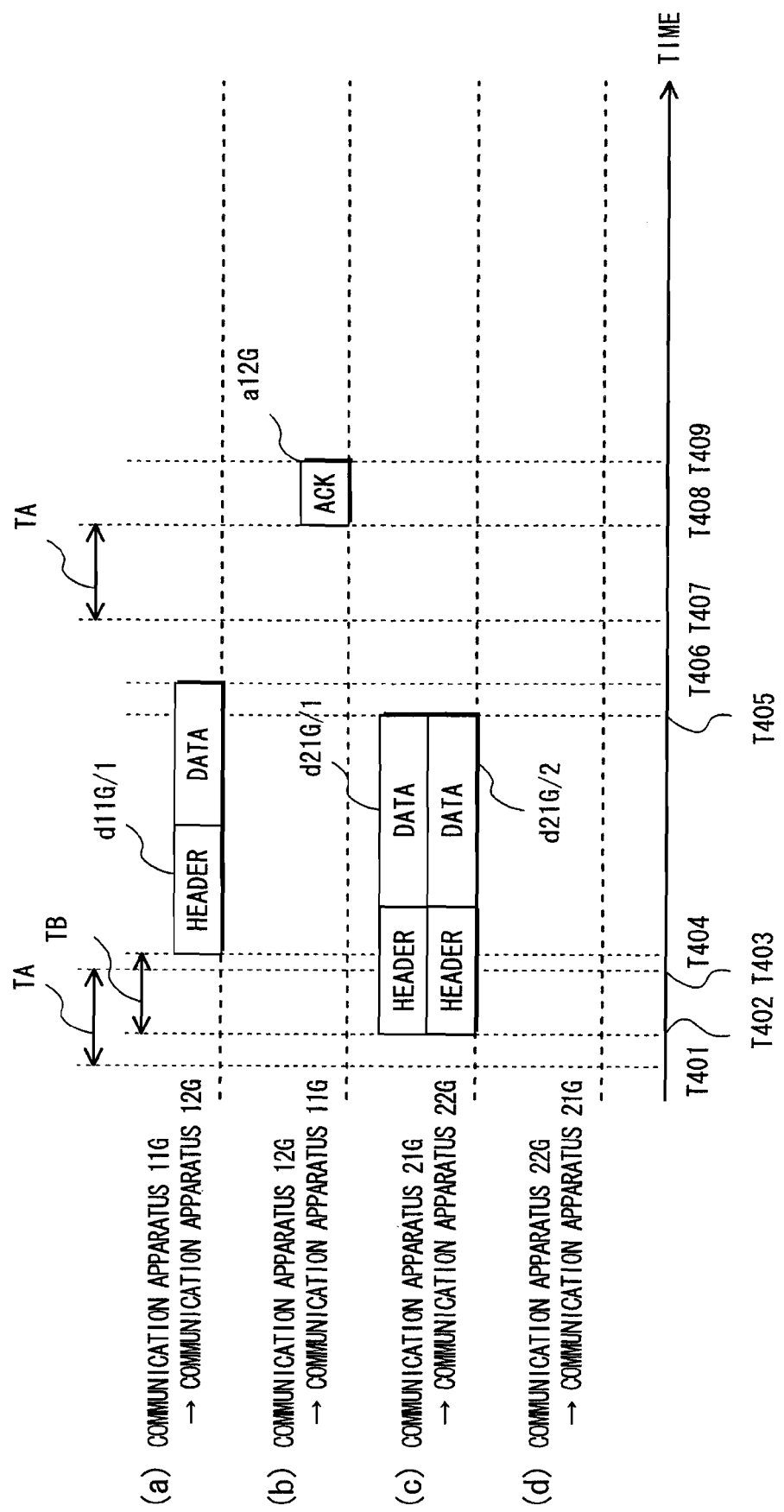
FIG. 26 shows an example of a transmission sequence of the wireless communication system shown in FIG. 25.

FIG. 26 shows an example of a transmission sequence of the wireless communication system shown in FIG. 25. In the transmission sequence shown in FIG. 26, the wireless communication apparatus 21G performs data transmission of "2" streams before the period TA has elapsed since the wireless communication apparatus 11G has determined to transmit a data packet.

At a time T401, the wireless communication apparatus 11G determines to transmit a data packet, and then performs interference signal detection for the period TA.

At a time T402 included in the period for which the wireless communication apparatus 11G performs interference signal detection, the wireless communication apparatus 21G starts transmitting data packets d21G/1 and d21G/2 ("2" streams) to the wireless communication apparatus 22F. At a time T405, the wireless communication apparatus 21G completes the transmission of the data packets d21G/1 and d21G/2.

At the time 1402 preceding a time 1403 at which the period TA has elapsed since the time T401, the wireless communication apparatus 11G detects the data packets d21G/1 and d21G/2 (interference signals). The wireless communication apparatus 11G judges whether it is possible to transmit the data packet concurrently with the interference signals. In this transmission sequence, the wireless communication apparatus 11G judges that it is possible to transmit the data packet concurrently with the interference signals.

Until the period TB has elapsed since the time T402 at which the interference signals have been detected, the wireless communication apparatus 11G waits to transmit the data packet and further performs interference signal detection.

The wireless communication apparatus 11G does not detect a new interference signal for the period TB. At a time T404 at which the period TB has elapsed since the time T402, the wireless communication apparatus 11G determines the number of streams to be used as "1" which is less by two than the number of streams that the wireless communication apparatus 11G can perform data transmission (the maximum number of transmittable streams) "3". This is because the wireless communication apparatus 11G has detected two interference signals. Then, at the time T404, the wireless communication apparatus 11G starts transmitting a data packet d11G/1 to the wireless communication apparatus 12G. At a time T406, the wireless communication apparatus 11G completes the transmission of the data packet d11G/1.

At a time T407, the wireless communication apparatus 12G determines to transmit an ACK packet as a response to the data packet d11G/1, and then performs interference signal detection for the period TA.

The wireless communication apparatus 12G does not detect an interference signal for the period TA. At a time T408 at which the period TA has elapsed since the time T407, the wireless communication apparatus 12G starts transmitting an ACK packet a12G to the wireless communication apparatus 11G. At a time T409, the wireless communication apparatus 12G completes the transmission of the ACK packet a12G.

<Structure of Wireless Communication Apparatus>

Figure 27:
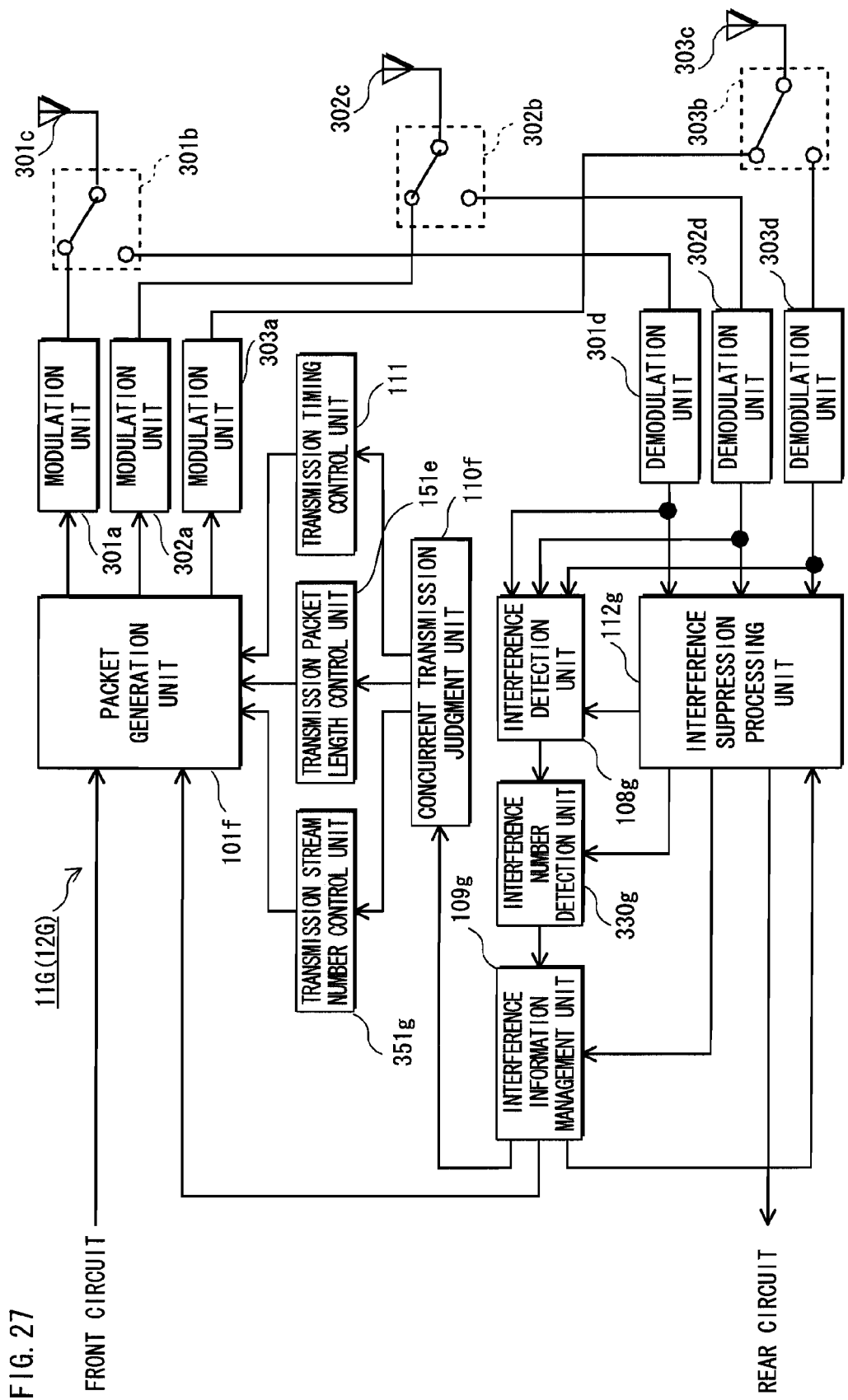
FIG. 27 shows the apparatus structure of a wireless communication apparatus according to the modification of the third embodiment.
Figure 28:
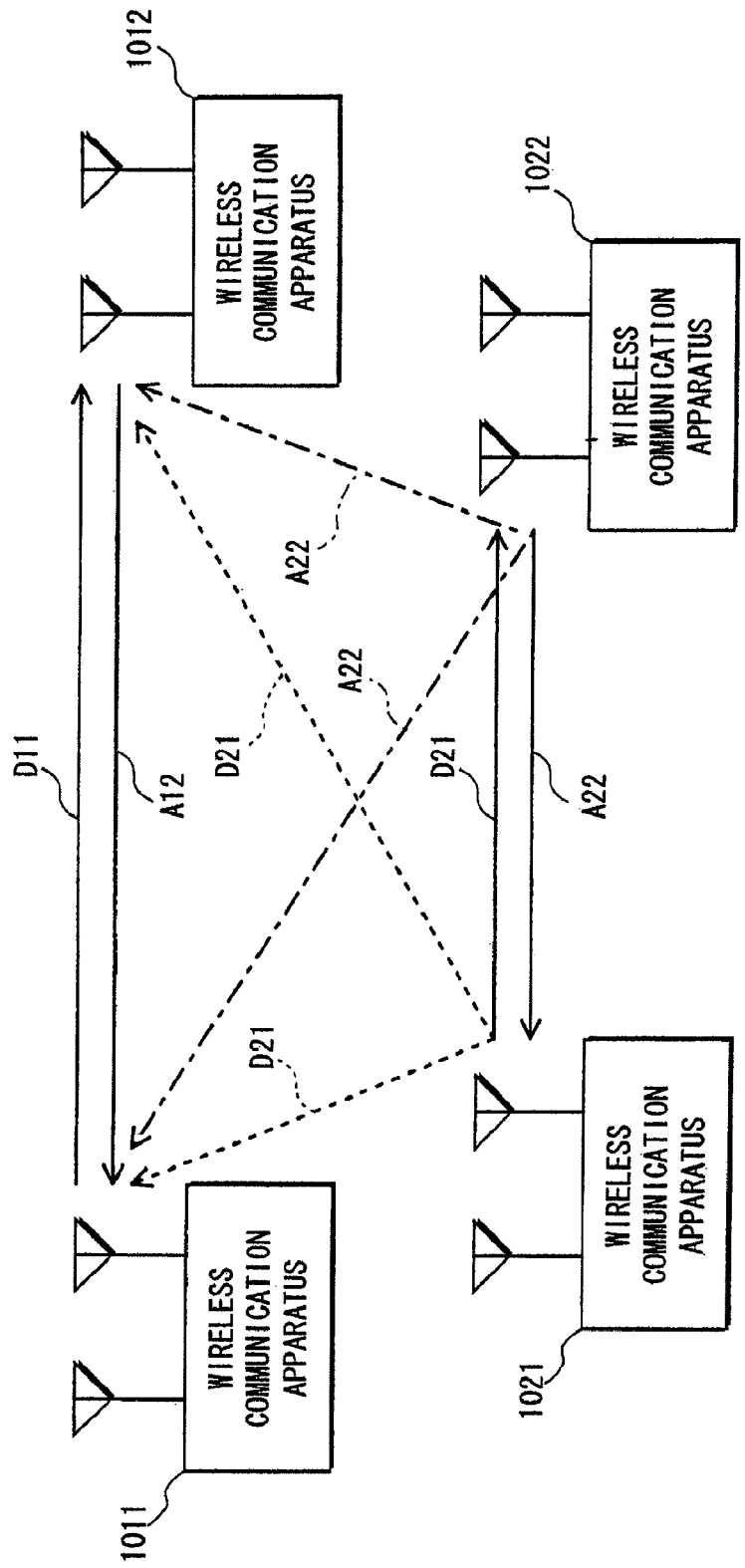
FIG. 28 shows a conventional wireless communication system.
Figure 30A:
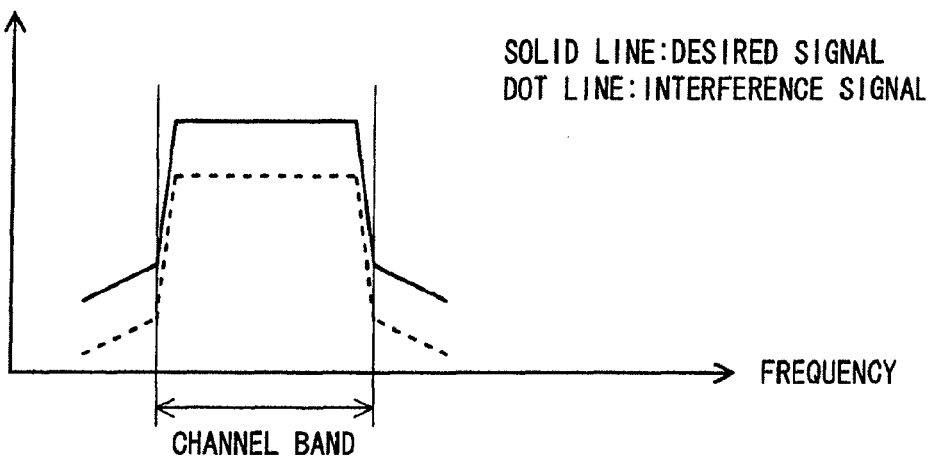
FIG. 30A is a pattern diagram showing the CCI (Co-Channel Interference)
Figure 30B:
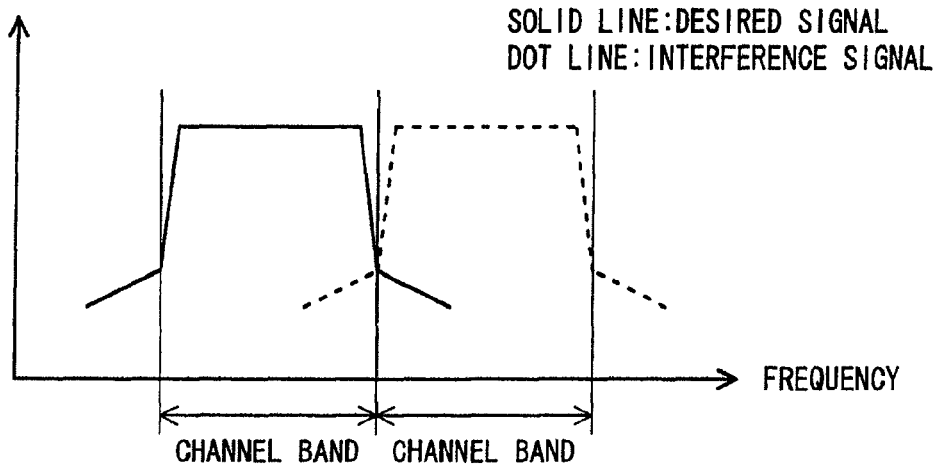
FIG. 30B is a pattern diagram showing the ACI (Adjacent Channel Interference).

FIG. 27 shows the structure of the wireless communication apparatus 11G shown in FIG. 25. Note that the wireless communication apparatus 12G has the same structure as the wireless communication apparatus 11G. Compositional elements according to the modification of the third embodiment having substantially the same functions as the compositional elements according to the above embodiments and modifications have the same reference letters of those according to the embodiments and modifications. The explanation of the above embodiments and modifications is applicable to this modification. Accordingly, the explanation of the compositional elements according to this modification is omitted here.

The wireless communication apparatus 11G includes a packet generation unit 101f, modulation units 301a, 302a, and 303a, switch circuits 301b, 302b, and 303b, antennas 301c, 302c, and 303c, demodulation units 301d, 302d, and 303d, an interference detection unit 108g, an interference number detection unit 330g, an interference information management unit 109g, a concurrent transmission judgment unit 110f, a transmission timing control unit 111, a transmission packet length control unit 151e, and a transmission stream number control unit 351g.

In addition to performing the processing of the interference suppression processing unit 112, the interference suppression processing unit 112g outputs, to the interference detection unit 108g, a destination address and a length of a packet included in a header of decoded data on a channel that is the same as the channel on which the wireless communication unit transmits the packet. Also, the interference suppression processing unit 112g outputs, to the interference detection unit 303g, the number of streams and a power level at which the streams is received on the same channel at the same time.

The interference detection unit 108g judges whether a received signal is a desired signal or an interference signal based on a destination address input by the interference suppression processing unit 112g. If the destination address input by the interference suppression processing unit 112g is not an address of the wireless communication apparatus, the interference detection unit 108g judges that the received signal is an interference signal. Then, the interference detection unit 108g outputs channel information of the interference signal, a power level at which the interference signal is received, and a length of a packet included in a header thereof, to the interference number detection unit 330g. If the destination address input by the interference suppression processing unit 112g is the address of the wireless communication apparatus, the interference detection unit 108g judges that the received signal is a desired signal.

Based on the number of streams input by the interference suppression processing unit 112g, the interference number detection unit 330g detects the number of streams that are being received as interference signals (the number of interference signals), and outputs the detected number of the interference signals together with the information input by the interference detection unit 108g, to the interference information management unit 109g.

The interference information management unit 109g stores therein channel information of the interference signals, the power level thereof, and the packet length thereof that have been detected by the interference detection unit 108g, and further stores therein the number of the interference signals.

The transmission stream number control unit 351 subtracts the number of interference signals (the total number of streams as being received as interference signals) from the number of streams that can be used for data transmission performed by the wireless communication apparatus (the maximum number of transmittable streams), and determines a result of the subtraction as the number of streams to be used. The packet generation unit 101f divides the transmission data into pieces of subdata whose number is the determined number of streams to be used, and packetizes the pieces of subdata, and then outputs the packetized pieces of subdata to a rear circuit.

The wireless communication apparatus according to this modification controls how many streams is to be used for data transmission among the maximum number of transmittable streams, based on the number of streams superimposed on a detected interference signal.

Note that the present invention is not limited to the above embodiments and modifications, and includes any appropriate combinations of the above embodiments and modifications, for example.

Also, the present invention is applicable to various fields. For example, in addition to the wireless LAN system using the CSMA (Carrier Sense Multiple Access), the present invention is applicable to wireless communication systems using various access methods such as the TDMA (Time Division Multiple Access), the FDMA (Frequency Division Multiple Access), the CDMA (Code Division Multiple Access), and the SDMA (Space Division Multiple Access).

Furthermore, the structures of all the embodiments and modifications of the present invention may be realized typically as LSIs (Large Scale Integrations) that are integrated circuits. These circuits may be realized as separate chips. Alternatively, some or all of circuits may be integrated onto a single chip.

Note that although LSIs are used here, the circuits may be variously described as ICs (Integrated Circuits), system LSIs, super LSIs, or ultra LSIs, depending on the level of integration.

Note also that the technique used to make an integrated circuit does not have to be LSI. A special-purpose circuit or general-purpose processor may be used instead. LSI circuits whose configurations can be altered after production such as the programmable FPGA (Field Programmable Gate Array) or a reconfigurable processor that can reconfigure the connection and settings of the circuit cells inside the LSI.

Moreover, if, due to progress in the field of semiconductor technology or the derivation of another technology, a technology to replace LSI emerges, that technology may, as a matter of course, be used to integrate the functional block. The use of biotechnology and the like is considered to be a possibility.

Furthermore, a hardware resource including a processor and a memory may have a structure in which control is performed by the processor executing a control program stored in the memory.

INDUSTRIAL APPLICABILITY

The present invention can suppress an interference signal arriving from a wireless communication apparatus that performs communication at random times. Therefore, the present invention can be used for a wireless communication system using a random access method such as the CSMA (Carrier Sense Multiple Access).

The invention claimed is:

1. A transmitter performing wireless communication with a receiver having a function of suppressing an interference signal included in a received signal to acquire a desired signal by receiving the interference signal in advance for a predetermined period, the transmitter comprising:
   a detection unit operable to detect an arriving interference signal;
   a transmission unit operable to transmit a packet to the receiver;
   a transmission timing control unit operable to cause the transmission unit to transmit the packet after an elapse of the predetermined period since the detection unit has detected the arriving interference signal, regardless of whether the interference signal is still arriving, such that, when the interference signal is still arriving, the transmission unit will start transmitting the packet after the elapse of the predetermined period since the detection unit has detected the arriving interference signal; and
   a transmission packet length control unit operable to cause the transmission unit to divide the packet into subpackets during the transmission of the packet and temporarily suspend the transmission of the packet, based on a variation in a level of the arriving interference signal detected by the detection unit during the transmission of the packet,
   wherein, when the transmission unit transmits the packet at a time and when a new interference signal is expected to arrive before the transmission of the packet has completed, the transmission packet length control unit causes the transmission unit to divide the packet into the subpackets.

2. A transmitter performing wireless communication with a receiver having a function of suppressing an interference signal included in a received signal to acquire a desired signal by receiving the interference signal in advance for a predetermined period, the transmitter comprising:
   a detection unit operable to detect an arriving interference signal;
   a transmission unit operable to transmit a packet to the receiver;
   a transmission timing control unit operable to cause the transmission unit to transmit the packet after an elapse of the predetermined period since the detection unit has detected the arriving interference signal, regardless of whether the interference signal is still arriving, such that, when the interference signal is still arriving, the transmission unit will start transmitting the packet after the elapse of the predetermined period since the detection unit has detected the arriving interference signal; and
   a transmission packet length control unit operable to, based on a length of a packet included in a header of the arriving interference signal detected by the detection unit, control a length of the packet to be transmitted by the transmission unit.

3. A transmitter performing wireless communication with a receiver having a function of suppressing an interference signal included in a received signal to acquire a desired signal by receiving the interference signal in advance for a predetermined period, the transmitter comprising:
   a detection unit operable to detect an arriving interference signal;
   a transmission unit operable to transmit a packet to the receiver; and
   a transmission timing control unit operable to cause the transmission unit to transmit the packet after an elapse of the predetermined period since the detection unit has detected the arriving interference signal, regardless of whether the interference signal is still arriving, such that, when the interference signal is still arriving, the transmission unit will start transmitting the packet after the elapse of the predetermined period since the detection unit has detected the arriving interference signal,
   wherein the transmission unit transmits the packet using a plurality of streams, and
   wherein the transmitter further comprises:
      an interference number detection unit operable to detect a number of arriving interference signals detected by the detection unit; and
      a transmission stream number control unit operable to control a number of the plurality of streams to be used by the transmission unit, based on the number of the arriving interference signals detected by the interference number detection unit.

* * * * *